United States Patent
Choi et al.

(10) Patent No.: US 9,534,801 B2
(45) Date of Patent: Jan. 3, 2017

(54) HUMIDIFIER

(75) Inventors: Yong Hyuk Choi, Seoul (KR); Chin Hyuk Chang, Seoul (KR); Dong Wook Kim, Seoul (KR); Jae Hun Jung, Seoul (KR); Arunesh Kr Singh, Seoul (KR); Yo Sang Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 1175 days.

(21) Appl. No.: 13/131,845

(22) PCT Filed: Dec. 31, 2008

(86) PCT No.: PCT/KR2008/007846
§ 371 (c)(1),
(2), (4) Date: Nov. 21, 2011

(87) PCT Pub. No.: WO2010/062005
PCT Pub. Date: Jun. 3, 2010

(65) Prior Publication Data
US 2012/0064817 A1    Mar. 15, 2012

(30) Foreign Application Priority Data

Nov. 28, 2008 (KR) .......... 10-2008-0120008
Nov. 28, 2008 (KR) .......... 10-2008-0120011
Dec. 2, 2008 (KR) .......... 10-2008-0121397

(51) Int. Cl.
*F24F 7/007* (2006.01)
*F24F 6/04* (2006.01)
*F24F 6/00* (2006.01)

(52) U.S. Cl.
CPC ............ *F24F 6/04* (2013.01); *F24F 2006/006* (2013.01); *F24F 2221/17* (2013.01)

(58) Field of Classification Search
CPC .... F24F 2006/006; F24F 6/04; F24F 2221/17; F24F 3/14; F24F 3/1411; F24F 6/00; F24F 6/02; F24F 2006/065; F24F 6/16
(Continued)

(56) References Cited

U.S. PATENT DOCUMENTS 122,684 A * 1/1872 Fleming .................. 126/109
1,856,918 A * 5/1932 Jordan .................. 261/30
(Continued)

FOREIGN PATENT DOCUMENTS

CN      201014257 Y    1/2008
DE      3409 196 A1    9/1985
(Continued)

*Primary Examiner* — Gregory Huson
*Assistant Examiner* — Dana Tighe
(74) *Attorney, Agent, or Firm* — Dentons US LLP

(57) ABSTRACT

A wall mount-type evaporative humidifier according to an embodiment of the present invention includes a main body mounted on a wall and having an air intake port and an air blower port formed therein, a ventilator disposed within the main body and configured to suck air into the air intake port and blow the air toward the air blower port, a water guide disposed within the main body and having a water channel formed therein, a water tank configured to contain water in order to supply the water to the water guide and seated in the water guide, and a humidification filter configured to absorb water of the water guide and to supply moisture to air flowing toward the ventilator and seated in the water guide. The present invention is advantageous in that it can realize a humidifying effect and a cooling effect at the same time, has the high utilization of space, and can control the humidity of the entire room rapidly and uniformly.

16 Claims, 14 Drawing Sheets

(58) Field of Classification Search
USPC ......... 454/54, 237, 251, 337, 328, 350, 354, 454/355; 261/92, 94; 55/467, 471
See application file for complete search history.

(56) References Cited

U.S. PATENT DOCUMENTS

| | | | | |
|---|---|---|---|---|
| 2,638,644 | A | * | 5/1953 | Rauhut .......................... 96/142 |
| 3,309,021 | A | * | 3/1967 | Powers ........................ 237/78 R |
| 3,480,209 | A | * | 11/1969 | Stiles ............................ 237/1 R |
| 3,917,757 | A | | 11/1975 | Hoag |
| 4,520,864 | A | * | 6/1985 | Katagiri .................... F24F 6/06 165/60 |
| 4,803,849 | A | | 2/1989 | Diaz |
| 6,131,889 | A | | 10/2000 | Birdsell et al. |
| 7,266,971 | B2 | * | 9/2007 | Kang ............................. 62/317 |
| 2005/0001334 | A1 | | 1/2005 | Roberts et al. |
| 2008/0017039 | A1 | * | 1/2008 | Takahashi et al. ............. 96/240 |

FOREIGN PATENT DOCUMENTS

| | | |
|---|---|---|
| JP | 08-285314 | 11/1996 |
| JP | 11-325520 | 11/1999 |
| JP | 11-325520 A | 11/1999 |
| JP | 2005-61655 A | 3/2005 |
| JP | 2005-342619 | 12/2005 |
| KR | 20-0263133 | 2/2002 |
| KR | 20-0265726 | 2/2002 |
| KR | 10-2003-0011586 A | 2/2003 |
| KR | 10-2003-0083190 A | 10/2003 |
| KR | 10-2005-0102317 | 10/2005 |
| KR | 10-2007-0100545 | 10/2007 |
| WO | WO 98/38458 A1 | 9/1998 |

* cited by examiner

HUMIDIFIER

This application is a 35 U.S.C. §317 National Stage Entry of International Application NO. PCT/KR2008/007846, filed on Dec. 31, 2008, which claims priority to Korean Patent Application No: 10-2008-0120008, filed on Nov. 28, 2008, Korean Patent Application No. 10-2008-0120011, filed on Nov. 28, 2008 and Korean Patent Application No. 10-2008-0121397, filed on Dec. 2, 2008, all of which are hereby incorporated by reference in their entirety for all purposed as if fully set forth herein.

TECHNICAL FIELD

The present invention relates to a wall mount-type evaporative humidifier and, more particularly, to a wall mount-type evaporative humidifier, which is capable of supplying moisture, which is generated in an evaporative manner by a blown air, at a specific height of the wall of a room.

BACKGROUND ART

Generally, a humidifier is used to change the humidity of a room and is divided into an ultrasonic humidifier, a heating type humidifier, a combined type humidifier, and so on.

The ultrasonic humidifier uses a method of generating ultrasonic waves at the lower portion of a water tank, splitting water into small particles, and blowing the split water particles to the outside. Here, steam is cool steam.

The heating type humidifier uses a method of boiling water within the humidifier and blowing the boiled water particles as steam. Here, steam is hot steam.

The combined type humidifier uses a combination of the ultrasonic type and the heating type in order to take advantages of the heating type and the ultrasonic type. The combined type humidifier uses a method of raising water temperature in a heating pipe, sterilizing the water, and then blowing the sterilized using ultrasonic waves. In the combined type humidifier, warm steam and cool steam may be selected according to circumstances.

The ultrasonic humidifier, the heating type humidifier, and the combined type humidifier are configured to directly blow steam nearby in order to raise the humidity of a room, and are problematic in that they do not rapidly supply moisture to indoor areas, which are far from the humidifiers. Further, the ultrasonic humidifier, the heating type humidifier, and the combined type humidifier they are problematic that they mainly humidify nearby areas, but do not rapidly humidify areas, which are distant from the humidifiers.

DISCLOSURE

Technical Problem

It is, therefore, an object of the present invention to provide a wall mount-type evaporative humidifier, which is capable of supplying moisture generated when water evaporates to air and forcibly blowing the air at a specific height of a room.

Another object of the present invention is to provide a wall mount-type evaporative humidifier, which is capable of rapidly sucking and humidifying an indoor air and maximizing the area of indirect illuminations.

Still another object of the present invention is to provide a wall mount-type evaporative humidifier having a slim and compact construction.

Technical Solution

In accordance with an embodiment of the present invention, there is provided a wall mount-type evaporative humidifier, including a main body mounted on a wall and having an air intake port and an air blower port formed therein, a ventilator disposed within the main body and configured to suck air into the air intake port and blow the air toward the air blower port, a water guide disposed within the main body and having a water channel formed therein, a water tank configured to contain water in order to supply the water to the water guide and seated in the water guide, and a humidification filter configured to absorb water of the water guide and to supply moisture to air flowing toward the ventilator and seated in the water guide.

The water guide is lengthily disposed in rightward and leftward directions on a lower front side of the ventilator, an intake portion is eccentrically formed on one of right and left sides of the ventilator, the humidification filter is disposed in front of the intake portion of the ventilator, and the water tank is disposed on a side of the humidification filter.

The wall mount-type evaporative humidifier further includes a purification unit disposed between the air intake port and the humidification filter.

The main body has a front air intake port formed on its front side, a lower air intake port formed on its lower side, and an air blower port for blowing air formed on its topside.

The ventilator comprises a centrifugal fan having an intake portion formed on its front side and a blower portion formed on its topside, the lower air intake port is obliquely formed in a direction toward an upper forward side, and the blower portion is obliquely formed in a direction toward an upper forward side.

The air blower port and the lower air intake port are formed at positions where the air blower port overlaps the lower air intake port in upward and downward directions.

The lower air intake port is enclosed by front and rear plate parts, which are spaced apart from each other in forward and backward directions on a lower side of the main body, and left and right plate parts, which are spaced apart from each other in rightward and leftward directions on a lower side of the main body.

The wall mount-type evaporative humidifier further includes a front door rotatably coupled to the main body in order to cover or expose the front air intake port and having an air intake duct formed therein.

The front door includes a left door coupled to a left side of the main body in such a way as to rotate right and left, a right door coupled to a right side of the main body in such a way as to rotate right and left, and a control panel disposed in one of the left and right doors so that the air intake duct is formed between the control panel and at least one of the left and right doors while covering between-the left door and -the right door.

Each of the left door and the right door includes a lateral plate part covering part of a side of the main body, and a front plate part integrally formed with the lateral plate part and covering part of a front of the main body.

The front door includes a left door coupled to a left side of the main body in such a way as to rotate in a left direction, and a right door coupled to a right side of the main body in such a way as to rotate in a right direction and configured to form the air intake duct between the right door and the left door.

An intake guide unit for guiding suction of the air is formed in one of the left door and the right door and spaced apart from the one of the left door and the right door so that the air intake duct is formed between the intake guide unit and the other of the left door and the right door.

The main body includes a rear casing mounted on the wall, and a front casing disposed in front of the rear casing and having the air intake port and the air blower port formed therein.

The wall mount-type evaporative humidifier further includes lateral illuminators disposed on respective left and right sides of the main body and configured to irradiate light to the side of the main body.

The main body includes illuminator installation units in which the lateral illuminators are respectively disposed on the left and right sides of the main body.

Each of the lateral illuminators includes an illumination casing disposed within the main body and configured to have an open side, a PCB disposed in the illumination casing, a plurality of LEDs disposed in the PCB in the state in which the LEDs are spaced apart from each other, and a transparent plate configured to cover the open side of the illumination casing and to pass light, irradiated from the plurality of LEDs, therethrough.

The transparent plate is disposed on the same plane as the side of the main body.

The wall mount-type evaporative humidifier further includes a control panel for manipulating the wall mount-type evaporative humidifier, and a control unit for controlling the ventilator and the lateral illuminators when the control panel is manipulated.

When an operation command is input through the control panel, the control unit drives the ventilator and at the same time turns on the lateral illuminators.

The wall mount-type evaporative humidifier is mounted on a wall of a room, which is opposite to a wall in which an air conditioner for lowering an indoor temperature is mounted.

Advantageous Effects

In the wall-mount type evaporative humidifier having the above construction according to the present invention, moisture is included in air, which is forcibly blown, in an evaporative manner and then blown in a room at a specific height of the room. Accordingly, there are advantages in that a humidifying effect and a cooling effect by evaporated heat can be obtained at the same time, and the utilization of space, which is higher than that when a humidifier is placed on the bottom, can be obtained. Further, there is an advantage in that the humidify of a room can be controlled uniformly and rapidly because air blown by the air blower port reaches a long distance of the room.

Further, since the filter and the water tank are disposed on the right and right sides, there are advantages in that the filter and the water tank can be installed compactly and a width between the front and rear portions of the wall-mount type evaporative humidifier can be made slim as thin as possible.

Further, there are advantages in that one equipment can have both a purification function and a humidifying function because an indoor air is purified and then humidified, and a humidifying filter can be maintained cleanly and an indoor air can be maintained more pleasantly because impurities are not adhered to the humidifying filter.

Further, there are advantages in that an indoor air can be sucked and humidified rapidly and an upper indoor space can be humidified rapidly because the indoor air is sucked in both front and lower directions and then blown in an upward direction.

Further, the lower air intake port is obliquely formed in a direction toward a upper forward side, and the blower portion of the ventilator is obliquely formed in a direction toward a upper forward side, thereby widening the circulation area of air conditioned air blown into a room. Accordingly, there are advantages in that a maximum area of a room can be air-conditioned rapidly and what upwardly blown air is immediately sucked into the lower air intake port can be minimized.

Further, there are advantages in that a width between the front and rear portions of an air conditioner can be made slim and compact as much as possible because the air blower port and the lower air intake port are formed at a position where the air blower port overlaps the lower air intake port up and down, and an indoor air can be sucked more rapidly and then air-conditioned because the area of the lower air intake port is wide.

Further, cleanness can be improved because the right and left doors not the intake grill form the front of an air conditioner. Further, it is not necessary to rotate or move forward or backward a plurality of doors in order to form the air intake duct between the plurality of doors and the main body because the air intake duct is formed between the right and left doors. Accordingly, there is an advantage in that the construction is simple and cost is low.

Further, there are advantages in that an external lateral appearance can have a feeling of integration and a high-end appearance and alien substance, such as dust, is not worn between the right and left doors and the front of the main body because the right and left doors cover the front of the main body and a gap of the sides between the right and left doors.

Further, there is an advantage in that safety and a beautiful sight are improved because the intake guide unit guides the suction of air while covering a gap between the right and left doors, thus covering the inside between the right and left doors.

Further, there is an advantage in that a humidification function and a user?sensitivity can be increased because the lateral illuminators form indirect illumination while irradiating some of light to the right and left sides of the main body.

Further, there is an advantage in that a high-end humidifier is possible because the lateral illuminators include the plurality of LEDs spaced apart from each other, thus increasing the area of indirect illumination.

Further, there are advantages in that the surrounding of the lateral illuminators can make simple an external appearance and the breakage of the lateral illuminators can be minimized because the lateral illuminators are not projected externally to the main body.

Moreover, there is an advantage in that a user, etc. can check whether humidified air is blown or not through indirect illumination because the control unit controls the ventilator and the lateral illuminators at the same time and, therefore, indirect illumination is formed while humidified air is blown into a room.

In addition, there are advantages in that the wall-mount type evaporative humidifier can circulate indoor circulation air more smoothly within the entire room while increasing a cooling ability together with an air conditioner.

BEST MODE

Embodiments of a wall mount-type evaporative humidifier according to the present invention will be described in detail with reference to the accompanying drawings so that they can be readily implemented by those skilled in the art.

Figure 1:
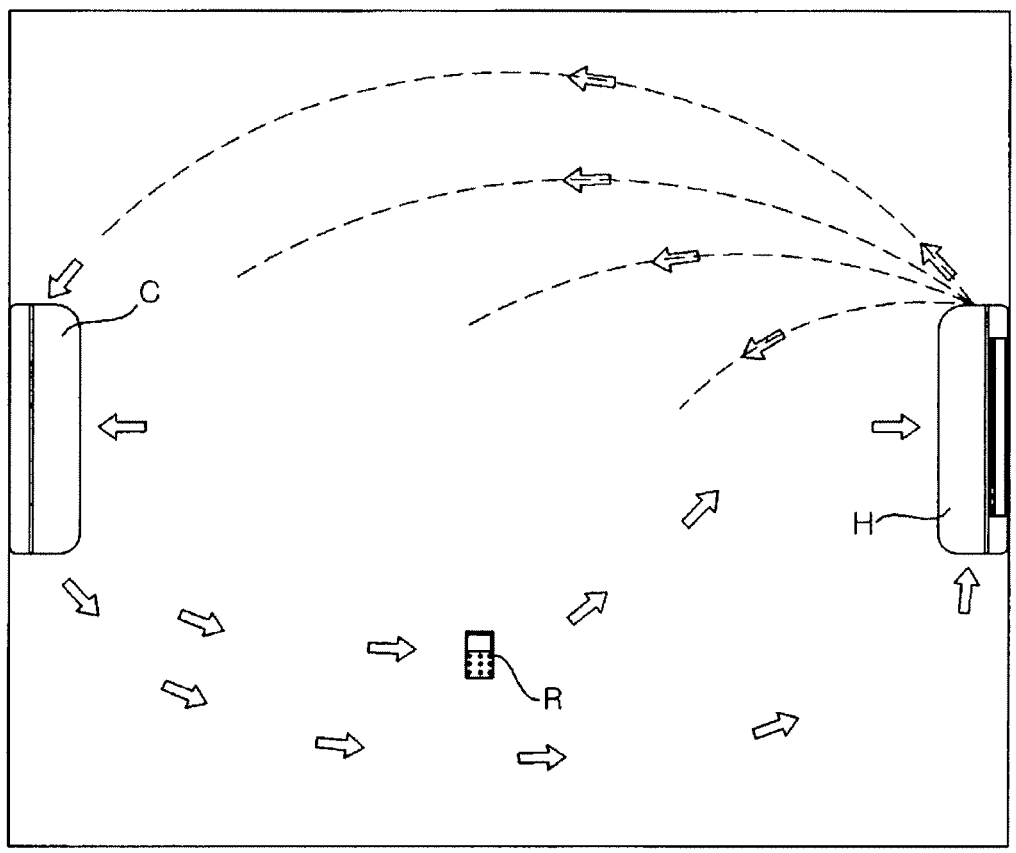
FIG. 1 is a schematic diagram showing an embodiment of an air conditioning system to which an embodiment of a wall mount-type evaporative humidifier according to the present invention is applied.

FIG. 1 is a schematic diagram showing an embodiment of an air conditioning system to which an embodiment of a wall mount-type evaporative humidifier according to the present invention is applied.

In the air conditioning system shown in FIG. 1, an air conditioner C for lowering an indoor temperature and a humidifier H for raising indoor humidity are placed in a room. The humidifier H is mounted on a wall opposite to a wall on which the air conditioner C is mounted. Air humidified by the humidifier H is supplied toward the wall on which the air conditioner C is mounted, and air cooled by the air conditioner C is supplied toward the wall on which the humidifier H is mounted.

The humidifier H is configured to suck the indoor air through its front and bottom sides, humidify the sucked air, and then blow the humidified air in an upward direction. The air conditioner C is configured to suck the indoor air through its front side or its front and top sides, cool the sucked air, and then blow the cool air. The indoor air humidifies and cools the room while circulating the humidifier H and the room, and the air conditioner C and the room.

The humidifier H and the air conditioner C may be operated independently using respective remote controllers or respective control panels, or may be associated with each other and operated using one remote controller or one control panel. Preferably, the humidifier H and the air conditioner C may be independently operated using one remote controller R and respective control panels. Alternatively, the humidifier H and the air conditioner C may be associated with each other and operated using one remote controller R and respective control panels.

The humidifier H consists of a ventilation evaporative humidifier, having a cooling effect obtained by evaporated heat as well as a humidifying effect, which are obtained when air forcibly ventilated passes through a humidification filter including moisture. Further, the humidifier H consists of a wall mount type humidifier, which is configured to form a circulation air current together with the air conditioner C mounted on a wall and is mounted on an indoor wall in order to increase the utilization of space. It is hereinafter assumed that the humidifier C is a wall mount-type evaporative humidifier H.

Figure 2:
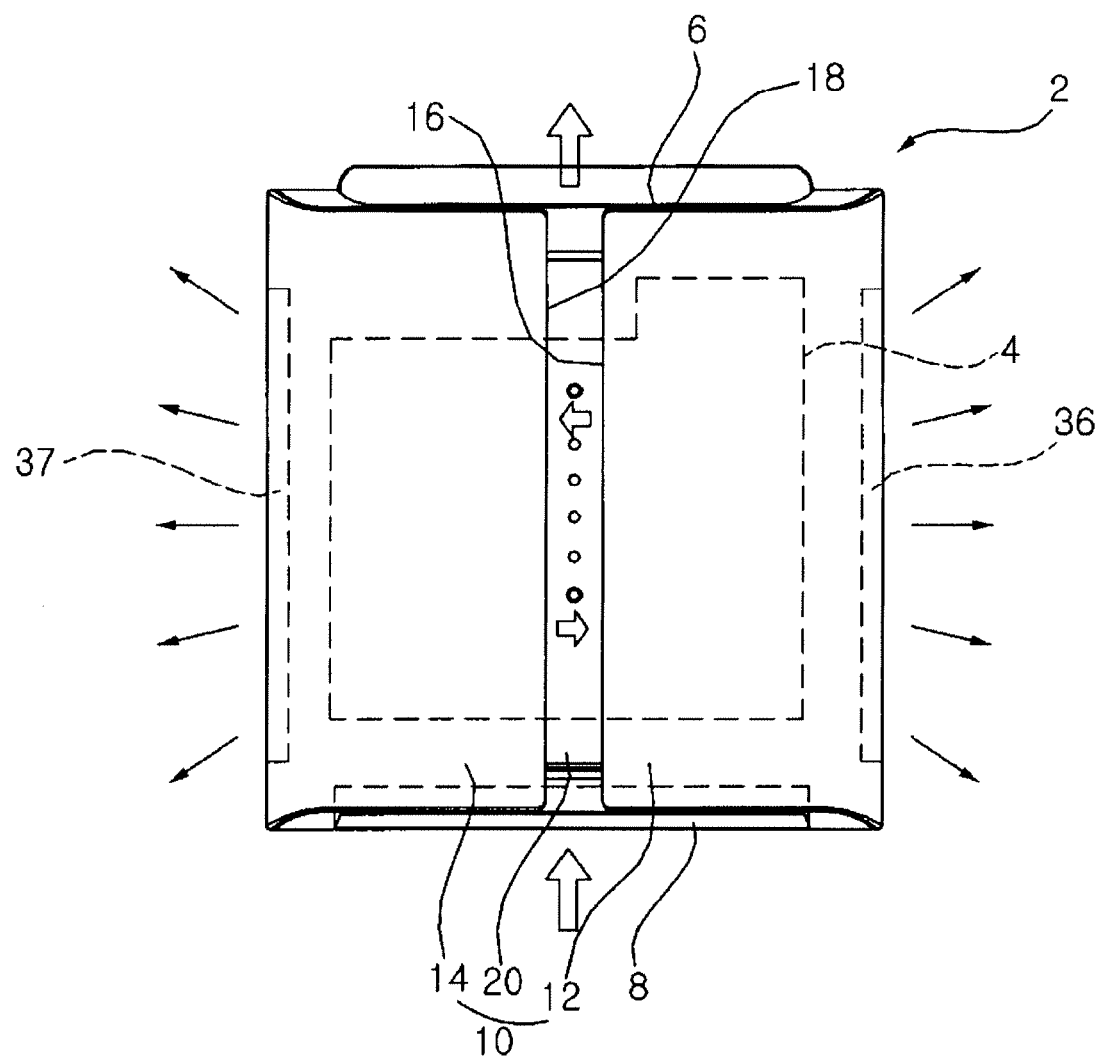
FIG. 2 is a front view showing an embodiment of the wall mount-type evaporative humidifier according to the present invention.

FIG. 2 is a front view showing an embodiment of the wall mount-type evaporative humidifier according to the present invention.

The wall mount-type evaporative humidifier shown in FIG. 2 has a flow passage structure in which a main body 2 mounted on a wall sucks an indoor air through its front and bottom parts, humidifies the sucked air, and then blows the humidified air in an upward direction.

The main body 2 has air intake ports 4 and 8 for sucking the indoor air and an air blower port 6 for blowing the air. The air intake ports 4 and 8 are respectively formed on the front and bottom sides of the main body 2, and the air blower port 6 is formed at the top of the main body 2.

The front air intake port 4 is formed on the front side of the main body 2, the air blower port 6 is formed on the top of the main body 2, and the lower air intake port 8 is formed at the bottom of the main body 2.

A front door 10 is disposed on the front side of the main body 2 and is configured to open and close the front air intake port 4 and form an external front appearance of the air conditioner.

The front door 10 is configured to rotate toward the front side of the front air intake port 4, thus covering and hiding the front air intake port 4, or to rotate toward sides other than the front side of the front air intake port 4, thus exposing the front air intake port 4. The front door 10 may also be configured to rotate in rightward and leftward directions around its vertical axis, thereby covering or exposing the front air intake port 4, and to rotate in upward and downward directions around its horizontal axis, thereby covering or exposing the front air intake port 4.

The front door 10 includes a left door 12 for opening/closing the front left side of the main body 2, a right door 14 for opening/closing the front right side of the main body 2, and a control panel 20 for displaying operation information generated when the wall mount-type evaporative humidifier is manipulated.

The front door 10 is formed to have a gap between the left door 12 and the right door 14 when they are closed, and the control panel 20 is disposed to hide the gap between the left door 12 and the right door 14.

The front door 10 is configured so that the indoor air is sucked into the front air intake port 4 without being moved or rotated in a forward direction of the main body 2. A left air intake duct 16 is formed between the control panel 20 and the left door 12, and a right air intake duct 18 is formed between the control panel 20 and the right door 14. The control panel 20 is disposed in one of the left door 12 and the right door 14.

Meanwhile, illuminators are disposed in the main body 2. The illuminators may be preferably formed in faces other than the portions in which the air intake ports 4 and 8 and the air blower port 6 are formed, of the main body 2, in order to widen the illumination area. The illuminators may be formed in the left and right sides of the main body 2, respectively, so that they can indirectly illuminate both the sides of the main body 2.

That is, lateral illuminators 36 and 37 are respectively disposed on the left and right sides of the main body 2. The indoor air is sucked through the front and bottom sides of the main body 2, humidified therein, and then blown in an upward direction. The lateral illuminators 36 and 37 indirectly illuminate the respective left and right sides of the main body 2.

Figure 3:
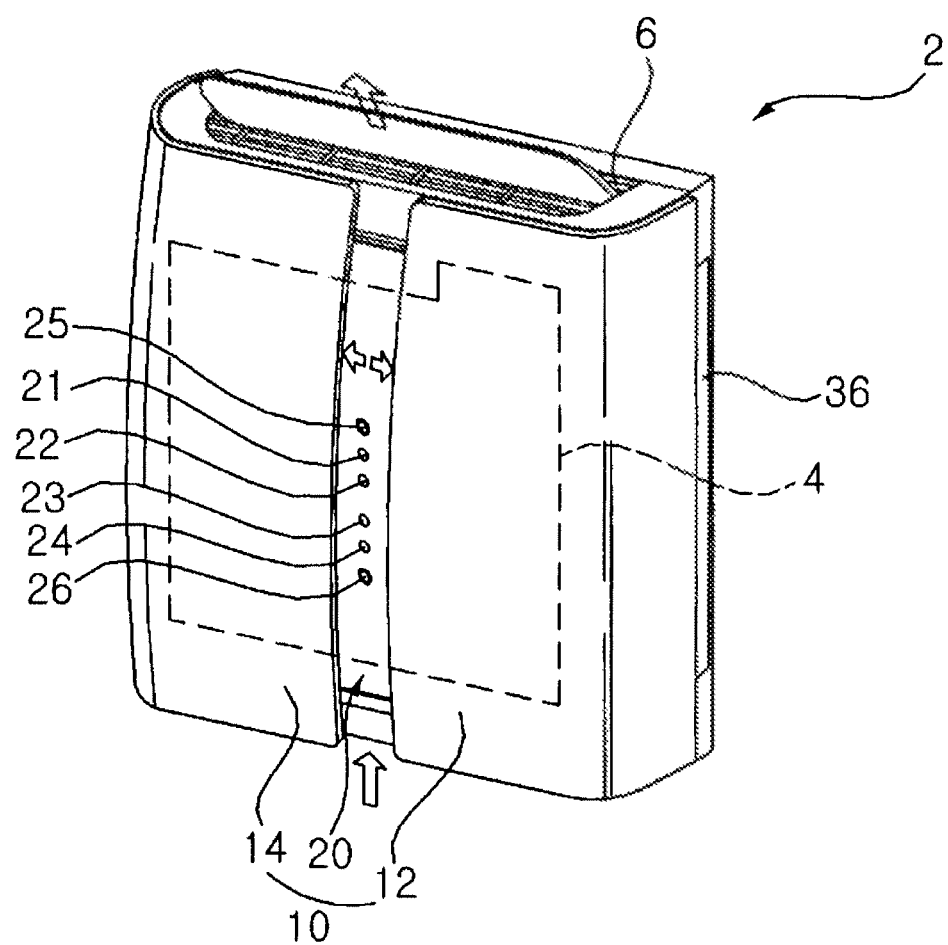
FIG. 3 is a perspective view showing an embodiment of the wall mount-type evaporative humidifier according to the present invention.

FIG. 3 is a perspective view showing an embodiment of the wall mount-type evaporative humidifier according to the present invention.

The control panel 20 includes one or more display units 21, 22, 23, and 24 for displaying information of the wall mount-type evaporative humidifier, a remote controller reception unit 25 for receiving signal from a remote controller, and an operation key 26 for forcibly operating/stopping the wall mount-type evaporative humidifier.

The one or more display units 21, 22, 23, and 24, the remote controller reception unit 25, and the operation key 26 are disposed in upward and downward directions with them being spaced apart from each other, and disposed at positions exposed between the left door 12 and the right door 14.

The plurality of display units 21, 22, 23, and 24 includes an operation display unit 21, a scheduled sleep time display unit 22, a sterilization display unit 23, and a water supply informing display unit 24.

Figure 4:
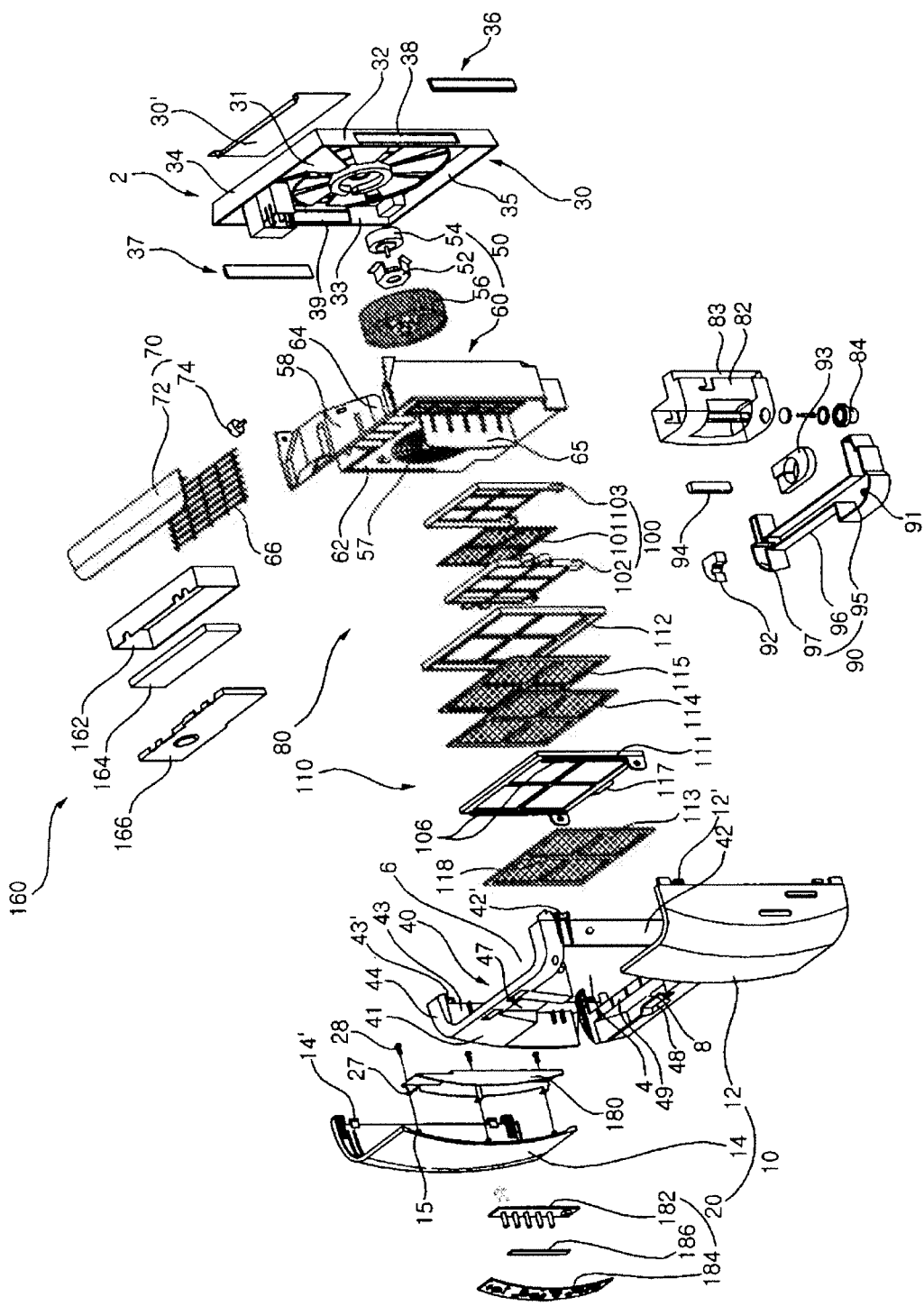
FIG. 4 is an exploded perspective view showing an embodiment of the wall mount-type evaporative humidifier according to the present invention.
Figure 5:
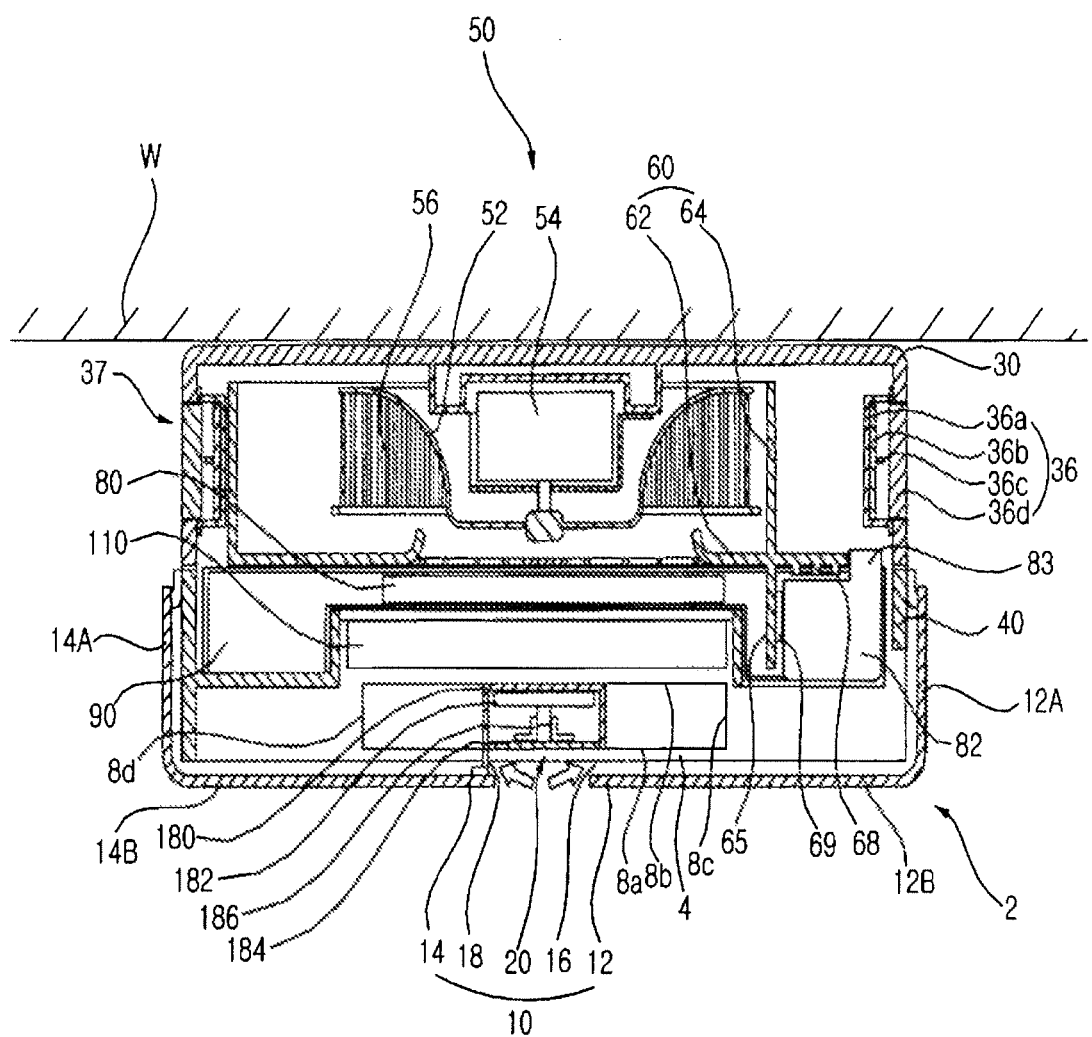
FIG. 5 is a lateral cross-sectional view showing an embodiment of the wall mount-type evaporative humidifier according to the present invention when the humidifier is actuated.
Figure 6:
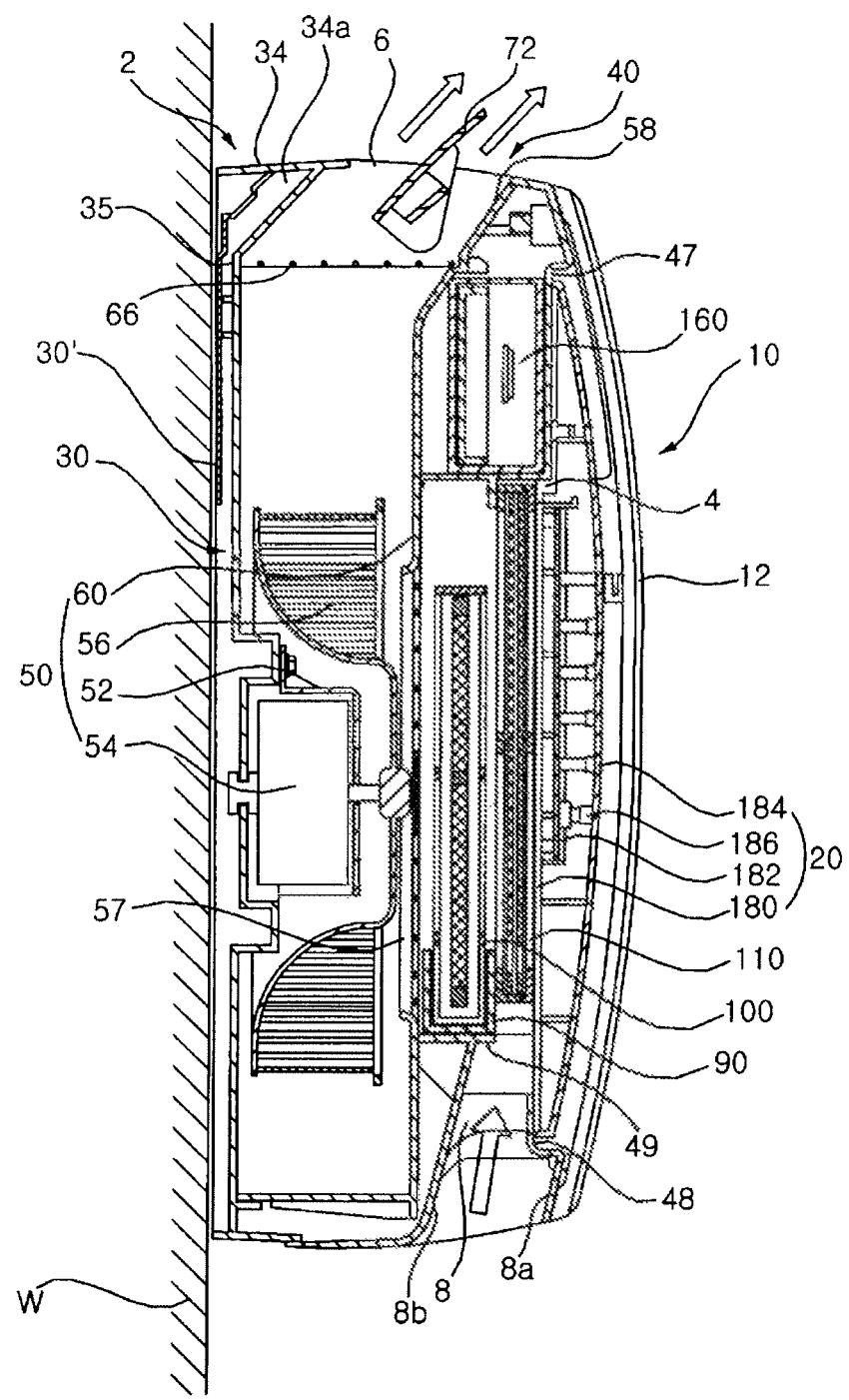
FIG. 6 is a longitudinal cross-sectional view showing an embodiment of the wall mount-type evaporative humidifier according to the present invention when the humidifier is actuated.
Figure 7:
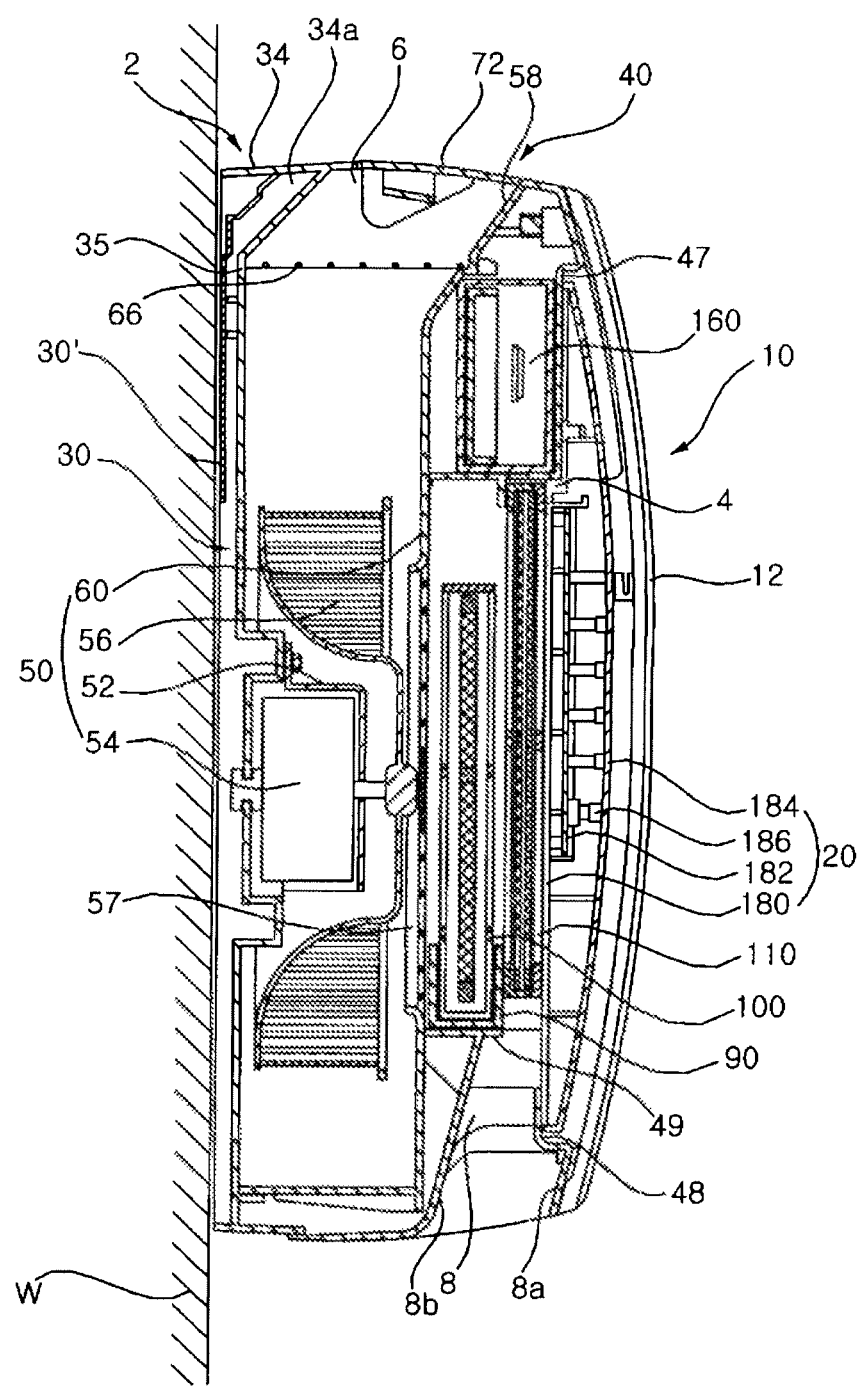
FIG. 7 is a longitudinal cross-sectional view showing an embodiment of the wall mount-type evaporative humidifier according to the present invention when the humidifier is not actuated.
Figure 8:
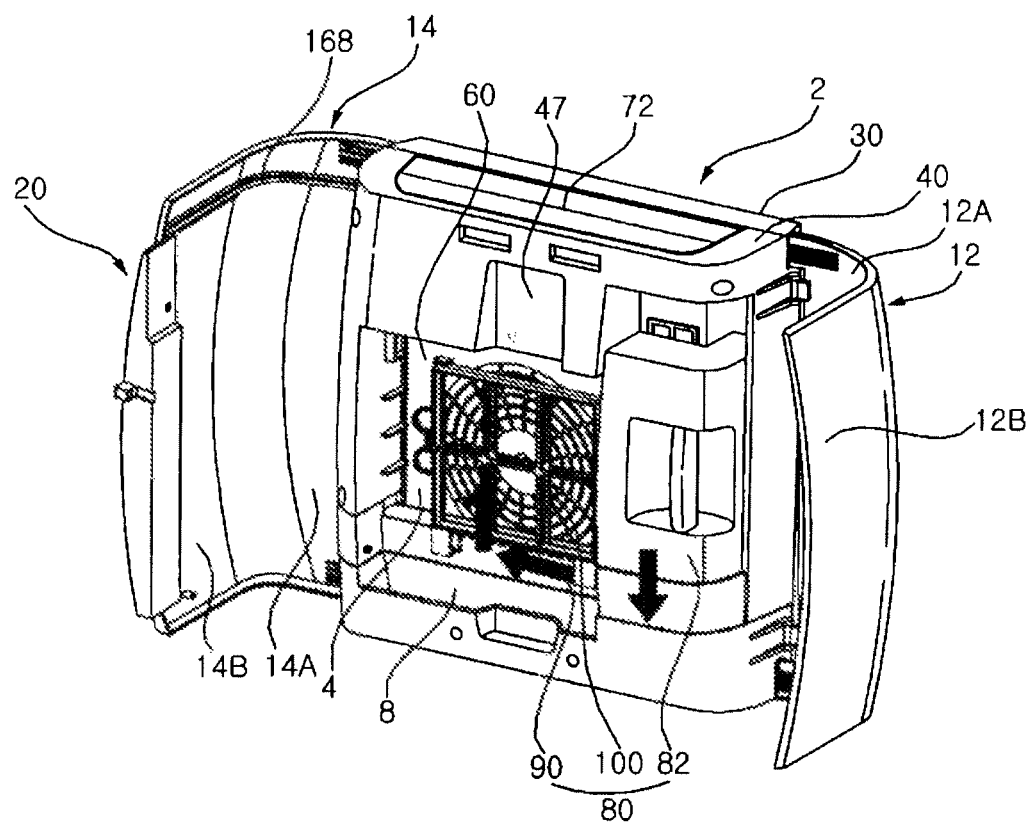
FIG. 8 is a perspective view schematically showing the flow of water showing an embodiment of the wall mount-type evaporative humidifier according to the present invention.

FIG. 4 is an exploded perspective view showing an embodiment of the wall mount-type evaporative humidifier according to the present invention, FIG. 5 is a lateral cross-sectional view showing an embodiment of the wall mount-type evaporative humidifier according to the present invention when the humidifier is actuated, FIG. 6 is a longitudinal cross-sectional view showing an embodiment of the wall mount-type evaporative humidifier according to the present invention when the humidifier is actuated, FIG. 7 is a longitudinal cross-sectional view showing an embodiment of the wall mount-type evaporative humidifier according to the present invention when the humidifier is not actuated, and FIG. 8 is a perspective view schematically showing the flow of water showing an embodiment of the wall mount-type evaporative humidifier according to the present invention.

The main body 2 includes a rear casing 30 and a front casing 40 disposed on the front side of the rear casing 30.

The rear casing 30 forms an external rear appearance of the wall mount-type evaporative humidifier, and may be formed to have a plate body form or a box form having an open front side. It is hereinafter assumed that the rear casing 30 has a box form having a space between the rear casing 30 and the front casing 40.

The rear casing 30 includes, as shown in FIG. 4, a rear plate part 31, a left plate part 32, a right plate part 33, an upper plate part 34, and a lower plate part 35.

The rear casing 30 includes, as shown in FIGS. 6 and 7, a latch groove 34a at its upper rear side, that is, between the upper plate part 34 and the rear plate part 35. The latch groove 34a is raised and disposed in a mounter 30' coupled to a wall W via a fixing member.

The front casing 40 forms an external front appearance of the wall mount-type evaporative humidifier and has a box form having an open rear side.

Illuminator installation units 38 and 39 in which the lateral illuminators 36 and 37 are respectively disposed are formed on both the sides of at least one of the rear casing 30 and the front casing 40, as shown in FIG. 4.

The lateral illuminators 36 and 37 indirectly illuminate the left and right sides of the wall mount-type evaporative humidifier on the left and right sides of the wall mount-type evaporative humidifier, respectively, and includes the left illuminator 36 and the right illuminator 37.

If the lateral illuminators 36 and 37 are disposed on a rear side of the lateral sides of the main body 2, some of illumination from the lateral illuminators 36 and 37 can perform efficient indirect illumination toward the wall. Accordingly, the lateral illuminators 36 and 37 are preferably disposed in the left plate 32 and the right plate 33 of the rear casing 30, respectively. It is hereinafter assumed that the lateral illuminators 36 and 37 are respectively disposed in the left plate 32 and the right plate 33 of the rear casing 30.

The illuminator installation units 38 and 39 are formed such that the external appearances of the lateral illuminators 36 and 37 are placed on the same face as those of the left and right sides of the rear casing 30 and not projected therefrom. Each of the illuminator installation units 38 and 39 may have an insertion groove portion perforated in rightward and leftward directions or an insertion groove portion, which is depressed slightly deeper than a thickness of each of the lateral illuminators 36 and 37.

In the case in which each of the illuminator installation units 38 and 39 has an insertion groove portion, a through portion through which lead wires for connecting the lateral illuminators 36 and 37 to a control unit 160 pass must be formed in the insertion groove portion. Accordingly, it is preferred that each of the illuminator installation units 38 and 39 have a simple insertion groove portion and the lateral illuminators 36 and 37 be formed to close up each of the illuminator installation units 38 and 39.

Each of the lateral illuminators 36 and 37 includes, as shown in FIG. 5, an illumination casing 36a disposed within the main body 2 and configured to have an open lateral side, a Printed Circuit Board (PCB) 36b disposed in the illumination casing 36a, a plurality of Light-Emitting Diodes (LEDs) 36c disposed in the PCB 36b with them being spaced apart from each other, and a transparent plate 36d configured to cover the open surface of the illumination casing 36a and transmit light, irradiated by the plurality of LEDs 36c, therethrough.

The transparent plate 36d is coupled to the illumination casing 36a or the lateral plate part of the rear casing 30 so that it is placed on the same face as the lateral side of the main body, in particular, the rear casing 30.

The front casing 40 may be formed such that the front air intake port 4 is formed in at least one of a front plate part 41, and left and right plate parts 42 and 43 of the front casing 40 or the front air intake port 4 is perforated only in the front plate part 41 of the front casing 40. It is hereinafter assumed that the front air intake port 4 is formed in at least one of the front plate part 41, and the left and right plate parts 42 and 43 of the front casing 40 so that a water tank 82 and a purification unit 110 can be easily inserted into or pulled out from the front casing 40.

The front casing 40 is formed so that the front air intake port 4 is perforated from the front plate part 41 to one lateral plate part 42 of the left and right plate parts 42 and 43, which is close to the water tank 82, so that a user, etc. can easily grasp the water tank 82.

The front casing 40 includes a front slot portion in which the front air intake port 4 is formed in the front plate part 41 in rightward and leftward directions and a side slot portion. The side slot portion is consecutive to the front slot portion and formed in the left plate part 42 in upward and downward directions, thus exposing part of the lateral side of the water tank 82.

The front casing 40 functions as an entrance port for enabling the front air intake port 4 to suck air, sucked into the air intake ducts 16 and 18 of the front door 10, into the main body 2, and also an entrance port for entry/exit of the purification unit 110 and the water tank 82. The front air intake port 4 is formed on the rear side of the front door 10 and has a size smaller than that of the front part of the front door 10 so that it is shielded by the front door 10.

The front casing 40 is formed such that the air blower port 6 is opened in the upper plate part 44 in upward and downward directions, and it has a duct shape in which the lower air intake port 8 into which air under the front casing 40 is sucked into the front casing 40 is opened in upward and downward directions on its lower side.

The front casing 40 is formed such that the air blower port 6 is opened on the upper rear side of the front air intake port 4 in upward and downward directions and the lower air intake port 8 is opened on the lower rear side of the front air intake port 4 in upward and downward directions.

In the wall mount-type evaporative humidifier according to the present embodiment, when the left door 12 and the right door 14 are closed, the left door 12 and the right door 14 are disposed to approach the front casing 40 as close as possible, and the control panel 20 is placed on the rear side between the left door 12 and the right door 14. Control panel insertion portions 47 and 48 into which part of the control panel 20 is inserted are depressed in the main body 2, in particular, the front casing 40.

Further, the wall mount-type evaporative humidifier according to the present embodiment further includes a ventilator 50 disposed within the main body 2 and configured to suck air via the air intake ports 4 and 8 and blow the air to the air blower port 6, a wind direction control mechanism 70 for controlling the direction of a wind of the air, which is blown from the ventilator 50 to the air blower port 6, a humidification unit 80 for supplying moisture in a natural evaporative manner, and the purification unit 110 for purifying the air.

The ventilator 50 is a centrifugal fan for sucking the air ahead and blowing the air to its circumference, and has an intake portion 57 formed on its front side and a blower portion 58 formed on its topside.

The ventilator 50 includes a fan motor 54 coupled to the rear casing 30 by a motor mounter 52, a fan 56 disposed on the rotational shaft of the fan motor 54, and a fan housing 60 disposed to enclose the fan motor 54 and the fan 56 together with the rear casing 30. Further, the intake portion 57 is disposed on the front side of the fan housing 60, and the blower portion 58 is disposed on the upper side of the fan housing 60.

The fan housing 60 includes a front plate part 62 in which the intake portion 57 is placed, and a circumference part 64 projecting backward on the rear side of the front plate part 62.

The fan housing 60 has a grill formed in the intake portion 57.

The fan housing 60 has a scroll portion formed in the circumference part 64.

The ventilator 50 is formed to have a space in which the projection portion 83 of the water tank 82 is inserted and then accommodated, between the rear casing 30 and the front casing 40.

The front plate part 62 of the fan housing 60 is spaced apart from the rear casing 30 and the front casing 40. In particular, the front plate part 62 is spaced apart from the rear casing 30 and the front casing 40 at an interval, which is slightly greater than a right-left width of the projection portion 82 of the water tank 82.

The intake portion 57 of the ventilator 50 (in particular, the fan housing 60) is formed eccentrically to one side of the left and right sides.

A partition wall 65 projecting from the fan housing 60 is formed in the front plate part 62. The partition wall 65 partitions the front side of the fan housing 60 into a space through which the air passes and a space in which the water tank 82 is placed.

The fan housing 60 has a safe net 66 disposed in the blower portion 58.

The wind direction control mechanism 70 includes a blower vane 72 and a vane motor 74. The blower vane 72 is disposed in the blower portion 58 of the fan housing 60 and rotated around its horizontal axis in upward and downward directions. The vane motor 74 is disposed in the blower portion 58 of the fan housing 60 and configured to rotate the blower vane 72.

The humidification unit 80 includes the water tank 82, a water guide 90, and a humidification filter 100. The water tank 82 is covered with one of the left door 12 and the right door 14 and configured to contain water. The water guide 90 is disposed within the main body 2 and configured to have a water channel therein so that water output from the water tank 82 is contained therein. The humidification filter 100 is placed on water guide 90 in order to provide moisture to the air blown toward the ventilator 50.

The humidification unit 80 is disposed so that it can enter or exit from the main body 2 via the front air intake port 4.

The water tank 82 is disposed on the side of the humidification filter 100 and seated in the water guide 90 so that it is spaced apart from the humidification filter 100 right and left. The partition wall 65 is intervened between the water tank 82 and the humidification filter 100.

The water guide 90 is disposed on the lower front side of the ventilator 50 in rightward and leftward directions.

The humidification filter 110 is disposed on the front side of the intake portion 57 of the ventilator 50.

The purification unit 110 is configured to purify the air flowing toward the humidification filter 100 and disposed between the air intake ports 4 and 8 and the humidification filter 100 so that it can enter or exit from the front air intake port 4.

Meanwhile, the front air intake port 4 of the main body 2 is formed to have a height, which is higher than a maximum height of the humidification unit 80 and the purification unit 110, in order for the humidification unit 80 and the purification unit 110 to enter or exit from the front air intake port 4. The front air intake port 4 has a right-left width larger than that of the humidification unit 80 and the purification unit 110.

The water tank 82 and the purification unit 110 among the water tank 82, the water guide 90, the humidification filter 100, and the purification unit 110 are most frequently attached and detached, and are disposed on the right and left sides, respectively, in the rear of the front air intake port 4.

That is, the front air intake port 4 has a right-left width, which is greater than the sum of a right-left width of the water tank 82 and a right-left width of the purification unit 110, and the height of the water tank 82 is higher than that of the purification unit 110.

In the main body 2, the blowing position of humidified air differs depending on the location of the air blower port 6. It is preferred that the air blower port 6 be placed at a position, which is far from the wall (that is, on the front side of the top surface of the main body 2 as far as possible).

Further, the ventilator 50 is disposed on the rear side of an internal space of the main body 2 to as rear as possible in order to make compact and slim the air conditioner, and the blower portion 58 is obliquely formed toward the upper forward side of the ventilator 50.

The main body 2 may also have a hole structure in which the lower air intake port 8 is opened in the lower plate part of the main body 2 or a duct structure in which the lower air intake port 8 is lengthily formed in upward and downward directions under the main body 2. Preferably, the main body 2 may have a duct structure in order to prevent the inside of the air conditioner from being seen from the outside through the lower air intake port.

That is, the lower air intake port 8 includes front and rear plate parts 8a and 8b and left and right plate parts 8c and 8d. The front and rear plate parts 8a and 8b are spaced apart from each other in forward and backward directions on the lower side of the main body 2, and the left and right plate parts 8c and 8d are spaced apart from each other in rightward and leftward directions on the lower side of the main body 2.

A circulation area of the air blown through the air blower port 6 and an area through which the inside of the lower air intake port 8 is seen in a room are decided by a direction in which the lower air intake port 8 is formed. In the case in which the formation direction of the lower air intake port 8 is tilted in an upper backward direction, the indoor circulation area of the air blown through the air blower port 6 becomes narrow and a large portion of the inside of the lower air intake port 8 is seen from the outside. In the case in which the formation direction of the lower air intake port 8 is vertical in upward and downward directions or tilted in an upper forward side, the indoor circulation area of the air blown through the air blower port 6 becomes wide and a small portion of the inside of the lower air intake port 8 is seen from the outside.

The formation direction of the lower air intake port 8 may be preferably vertical in upward and downward directions or oblique in an upper forward direction. It is hereinafter assumed that the formation direction of the lower air intake port 8 be oblique in an upper forward direction.

Further, the lower air intake port 8 preferably has a maximum size in order for the indoor air to be sucked as fast as possible. Some of the lower air intake port 8 is formed at a location where the lower air intake port 8 overlaps the air blower port 6 in upward and downward directions in order to make compact.

The main body 2 further includes a seated unit 49, enabling the water guide 90 to be placed on the top end of the rear plate part 8b forming the lower air intake port 8. The seated unit 49 is formed horizontally as shown in FIGS. 4 and 6.

The humidification unit 80 is described below in more detail.

The water tank 82 functions to supply water, sucked by the humidification filter 100, to the water guide 90 and includes the projection portion 83 disposed on one of its right and left sides. The projection portion 83 is projected in a backward direction so that the projection portion 83 can contain water as much as possible while being compact.

The water tank 82 is disposed so that the projection portion 83 is inserted between one of the rear casing 30 and the front casing 40 and the front plate part 62 of the fan housing 60.

The water tank 82 includes a hole portion through which water passes. A cap 84 for controlling the water is formed in the hole portion.

The cap 84 includes a flow passage through which the water passes and a valve body movably disposed in the water guide 90 so that the valve body opens and closes the flow passage of the cap 84.

When the water tank 82 is seated in the water guide 90, the valve body of the cap 84 is moved in an inward direction of the water tank 82 by the water guide 90 or an ion purification resin filter 92 or moved in an outward direction of the water tank 82, thus opening the flow passage of the cap 82.

The water tank 82 is raised on the water guide 90 and then seated therein.

The water guide 90 has an open top surface so that the water tank 82 and the humidification filter 100 are seated therein and a water channel along which the water drained from the water tank 82 flows.

The water guide 90 includes a projection 91 for moving the valve body of the cap 84 in order to open the flow passage of the cap 84 when the water tank 82 is placed in the water guide 90.

The humidification unit 80 includes a water level sensor 92 for detecting the water level of the water channel of the water guide 90 and a soft water filter 93 for making soft the water drained from the water tank 82.

The water level sensor 92 detects a water level in order to inform when the water will be supplied, and includes a float whose height varies depending on a water level while floating by the water and a sensor disposed on the top of the water guide 90 or in the fan housing 60 of the ventilator 50 so that it is switched by the float.

The soft water filter 93 is formed from plastic resin including a polystyrene compound, and is an ion purification filter for making hard water soft by substituting ions, coated on the surface of the plastic resin, for Ca and Mg, which decides the degree of hardness in order to lower the degree of hardness of hard water. When the water tank 82 is seated in the water guide 90, the soft water filter 93 is disposed on the lower side of the water tank 82 so that the water drained from the water tank 82 is made soft and then flows into the humidification filter 100 along the water guide 90. The soft water filter 93 has a ring-shaped space on its inner circumference so that all or part of the cap 84 is inserted into and latched to the soft water filter 93.

The humidification unit 80 further includes a water sterilizer 94 for sterilizing the water of the water guide 90.

The water sterilizer 94 sterilizes water using $H_2O_2$ generated when a discharge electrode generates discharge in the water. When the water guide 90 is pulled out or mounted through the front air intake port 4 in order to provide services such as cleaning, the water sterilizer 94 is rotated by the water guide 90, enabling the attachment and detachment of the water guide 90. The top portion of the water sterilizer 94 is disposed in the fan housing 60 of the ventilator 50 in such a way as to be rotated around its horizontal axis such that the water sterilizer 94 is projected into the water guide 90 and the discharge electrode dips into the water when the water guide 90 is mounted.

The water guide 90 includes a water tank seated portion 95 in which the water tank 82 is seated and a flow passage portion 96 in which the humidification filter 100 is seated. The soft water filter 93 is disposed within the water tank seated portion 95, and the flow passage portion 96 is configured to extend from the water tank seated portion 95 and lengthily disposed on the lower front side of the fan housing 60 in rightward and leftward directions.

The water guide 90 includes a water level sensor installation portion 97 extending from one of the water tank seated portion 95 and the flow passage portion 96. The water level sensor 92 is disposed within the water level sensor installation portion 97.

The humidification filter 100 is configured to suck the water of the water guide 90 and supply moisture to the air flowing into the ventilator 50. The humidification filter 100 is seated in the flow passage portion 96 of the water guide 90.

The humidification filter 100 includes a filter member 101 for absorbing the water of the flow passage guide 90 and containing the absorbed water, and filter casings 102 and 103 for protecting the filter member 101. The filter casings 102 and 103 include a front filter casing 102 in which a front grill is formed and a rear filter casing 103 in which a rear grill is formed.

The humidification filter 100 is disposed on the front side of the intake portion 57 of the ventilator 50 and has a size greater than that of the intake portion 57.

The humidification filter 100 is placed on the flow passage portion 96 of the water guide 90 such that the bottom of the filter member 101 is disposed in the flow passage portion 96 of the water guide 90.

The purification unit 110 is described in more detail below.

The purification unit 110 is disposed between the front air intake port 4 and the humidification filter 100, and includes filter casings 111 and 112 and a plurality of filters 113, 114, and 115 disposed in the filter casings 111 and 112.

The filter casings 111 and 112 include a front filter casing 111 in which a front grill is formed and a rear filter casing 112 in which a rear grill is formed.

Front sliding guides 106 are formed in front of the front filter casing 111 of the filter casings 111 and 112 so that some of the filters 113, 114, and 115 slide upward and downward and are then attached thereto or detached therefrom.

The front sliding guides 106 are formed on both the right and left sides of the front filter casing 111 lengthily in upward and downward directions.

Handles 117 are projected from the respective filter casings 111 and 112.

The plurality of filters 113, 114, and 115 may include a plurality of filters, including a free filter for filtering alien substance in the air, a HEPA filter for filtering micro alien substance in the air, a cyclone fitter for collecting micro alien substance in the air by ionizing it using electricity, an allergy filter for eliminating allergy such as an Ag allershield filter, and a deodorization filter such as an active plate filter or a photocatalyst deodorization filter. It is hereinafter assumed that the plurality of filters 113, 114, and 115 include a free filter 113, an allergy filter 114, and a deodorization filter 115.

The free filter 113 is attached to or detached from the front side of the front filter casing 111 by the front sliding guides 106.

A handle 118 is formed on one of the front, upper, and lower ends of the free filter 113 and projected from the free filter 113.

The allergy filter 114 and the deodorization filter 115 are disposed within the front filter casing 111 and the rear filter casing 112, respectively, in order to protect the allergy filter 114 and the deodorization filter 115.

The purification unit 110 enters or exits from the front air intake port 4 in the state in which the plurality of filters 113, 114, and 115 is integrally formed. The purification unit 110 is disposed on the front side of the humidification filter 100 within the main body 2 and has a size larger than that of the humidification filter 100.

The purification unit 110 is disposed between the front plate part 62 of the fan housing 60 of the ventilator 50 and the upper side of the lower air intake port 8 so that the air sucked into the lower air intake port 8 is combined with the air sequentially passed through the air intake ducts 16 and 18 and the front air intake port 4 and then passes through the purification unit 110.

The front door 10 is described in more detail below.

The air intake ducts 16 and 18 of the front door 10 are disposed on the front side of the front air intake port 4 as shown in FIG. 5.

When the water tank 82 enters or exits through the front door 10, one of the left door 12 and the right door 14 is rotated laterally, thereby opening the front side of the water tank 82 of the front air intake port 4, and when the purification unit 110 enters or exits through the front door 10, the left door 12, the right door 14, and the control panel 20 open the front air intake port 4 fully.

It is hereinafter assumed that the water tank 82 enters or exits through the left side of the front air intake port 4, the left door 12 opens or closes the left side of the front air intake port 4 and at the same time covers or exposes the front side of the water tank 82 and part of the front side of the purification unit 110, the purification unit 110 enters or exits through the right side and the center of the front air intake port 4, and the right door 14 and the control panel 20 open or close the right side and the center of the front air intake port 4 and at the same time cover or expose portions that are not covered with or exposed by the left door 12 of the purification unit 110.

The left door 12 and the right door 14 may respectively have a flat plate body and may be hinged to the front plate part of the front casing 40 so that they can be rotated right and left, respectively, in order to open or close only part of the front side of the front casing 40. Alternatively, the left door 12 and the right door 14 may respectively have a curved plate body having a "L"-shaped cross section and may be rotatably coupled to the lateral plate part of the front casing 40 or the lateral plate part of the rear casing 30 so that both part of the front side and the lateral side of the front casing 40 can be opened or closed.

When viewed from the side of the wall mount-type evaporative humidifier, the left door 12 and the right door 14 preferably have respective curved plate bodies, each having a "L"-shaped cross section, so that between-the front side of the front casing 40 and the left door 12 and between-the front side of the front casing 40 and the right door 14 are not seen and alien substance, etc. may not be infiltrated into between the front side of the front casing 40 and the left door 12 and between the front side of the front casing 40 and the right door 14. It is hereinafter assumed that each of the left door 12 and the right door 14 is configured to have a curved plate body and coupled to the lateral plate part of the front casing 40 or the lateral plate part of the rear casing 30.

The left door 12 includes a lateral plate part 12A for covering part of the side of the main body 2 and a front plate part 12B, which is integrally formed with the lateral plate part 12A and configured to cover part of the front of the main body 2. The right door 14 includes a lateral plate part 14A for covering part of the side of the main body 2 and a front plate part 14B, which is integrally formed with the lateral plate part 14A and configured to cover part of the front of the main body 2.

That is, the front door 10 includes a left lateral plate part 12A enabling the left door 12 to cover part of the left side of the main body 2, a left front plate part 12B integrally formed with the left lateral plate part 12A and configured to cover the left side of the front of the main body 2, a right lateral plate part 14A enabling the right door 14 to cover part of the right side of the main body 2, and a right front plate part 14B integrally formed with the right lateral plate part 14A and configured to cover the right side of the front of the main body 2.

A left hinge shaft 42' is formed in one of the left lateral plate part 12A of the left door 12 and a left lateral plate part 42 of the front casing 40, and a left hinge latch 12 rotatably coupled to the left hinge shaft 42' is formed in the other of the left lateral plate part 12A of the left door 12 and the left lateral plate part 42 of the front casing 40.

A right hinge shaft 43' is formed in one of the right lateral plate part 14A of the right door 14 and a right lateral plate part 43 of the front casing 40, and a right hinge latch 14?rotatably coupled to the right hinge shaft 43' is formed in the other of the right lateral plate part 14A of the right door 14 and the right lateral plate part 43 of the front casing 40.

The control panel 20 is placed in the door 14 other than the door 12 for covering the water tank 82 such that it is not rotated when the water tank 82 enters or exits through the main body 2, but is rotated when the purification unit 110 enters or exits through the main body 2.

The control panel 20 has a control panel fixing part 27 formed therein. The control panel fixing part 27 is fixed to one of the left door 12 and the right door 14 in the state in which it is spaced apart from one of the left door 12 and the right door 14, as shown in FIG. 4.

A plurality of the control panel fixing parts 27 is provided in the control panel 20 in upward and downward directions in the state in which the control panel fixing parts 27 are spaced apart from each other.

The control panel fixing parts 27 may be fixed to the door 14 in which the control panel 20 is placed using fixing members, such as screws, or may be latched and mounted in the door 14 using latch members, such as hooks. It is hereinafter assumed that the control panel fixing parts 27 are fixed to the door 14 using fixing members.

The control panel fixing parts 27 include front and rear projection pieces forwardly projected from the lateral side of the control panel 20 on the lateral side of the control panel 20 and right and left projection pieces projected from the front ends of the front and rear projection pieces in rightward and leftward directions. A fixing hole through which each of fixing members 28, such as screws, is penetrated is formed in each of the right and left projection pieces.

A fixing unit 15 to which the fixing member 28, which has penetrated the fixing hole of each of the right and left projection pieces, is fixed is formed in the door 14 in which the control panel 20 is placed. The fixing unit 15 consists of a boss having a fixing hole, or a fixing hole.

The control panel 20 includes a control casing 180 having an open front, the plurality of LEDs inserted into and disposed in the control casing 180, the remote controller reception unit 25, a control PCB 182 in which an operation switch is placed, and a control cover 184 covering the front of the control casing 180 in order to protect the control PCB 182.

In the control cover 184, a light transmission unit from which light of the LEDs is transmitted is formed in front of each of the LEDs. A transmission unit through which signals transmitted from the remote controller pass is formed in front of the remote controller reception unit 25. A pressing unit is formed in front of the operation switch.

The control panel 20 further includes a light guide 186 for guiding light irradiated from the LEDs and protecting the LEDs.

The light guide 186 may be disposed on the rear side of the control cover 184 or in the control PCB 182.

Reference numeral 160 denotes the control unit for controlling the wall mount-type evaporative humidifier. The control unit is disposed within the main body 2 as shown in FIG. 4.

The control unit 160 includes a box body 162 having an open front, a PCB assembly 164 disposed within the box body 162, and a cover 166 covering the front of the box body 162.

In the control unit 160, the box body 162 and the cover 166 are formed from metallic materials.

The PCB assembly 164 includes a PCB in which a variety of electronic components to control the wall mount-type evaporative humidifier are disposed, and a PCB casing having the PCB disposed therein and formed from insulating materials such as synthetic resin materials.

The control unit 160 is fixed to the ventilator 50, in particular, the top of the front of the front plate part 62 of the fan housing 60 via a latch member, such as a hook, and a fixing member such as a screw.

The control unit 160 is coupled to the control panel 20 via lead wires 168.

Figure 9:
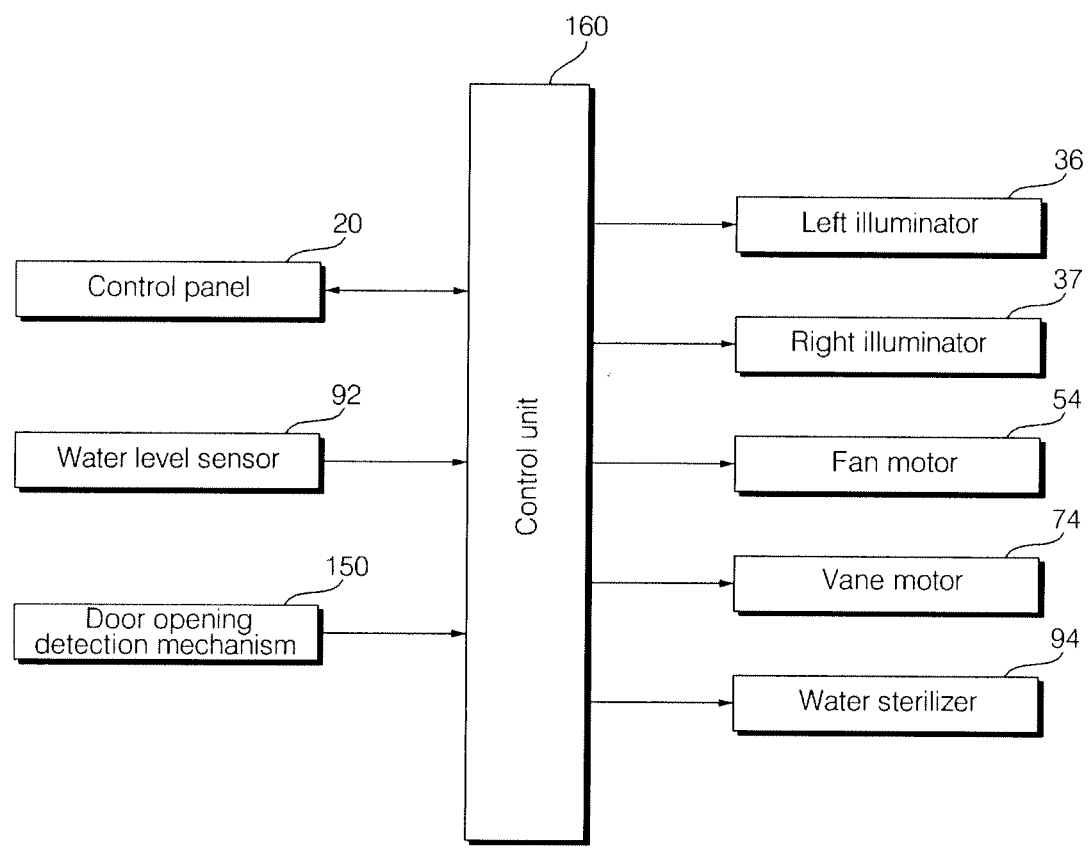
FIG. 9 is a front view when any one of left and right doors is rotated laterally in an embodiment of the wall mount-type evaporative humidifier according to the present invention.

FIG. 9 is a front view when any one of the left and right doors is rotated laterally in an embodiment of the wall mount-type evaporative humidifier according to the present invention.

The wall mount-type evaporative humidifier according to the present embodiment further includes a door opening detection mechanism 150 for detecting the opening of the front door 10.

The control unit 160 controls the control panel 20 depending on a detection result of the water level sensor 92 and controls the lateral illuminations 37 and 3, the fan motor 54, the vane motor 74, and the water sterilizer 94 depending on whether the control panel 20 has been manipulated and depending on a detection result of the door opening detection mechanism 150.

Figure 10:
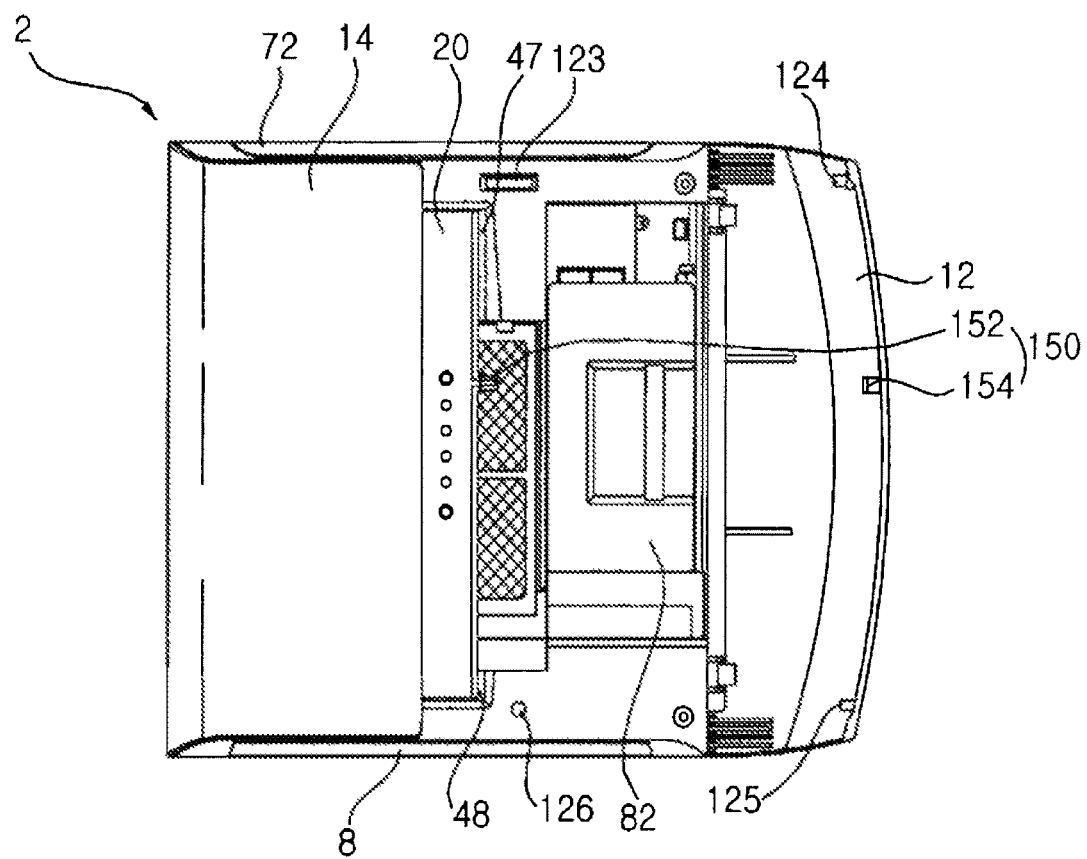
FIG. 10 is a front view when both the left and right doors are rotated laterally in an embodiment of the wall mount-type evaporative humidifier according to the present invention.
Figure 11:
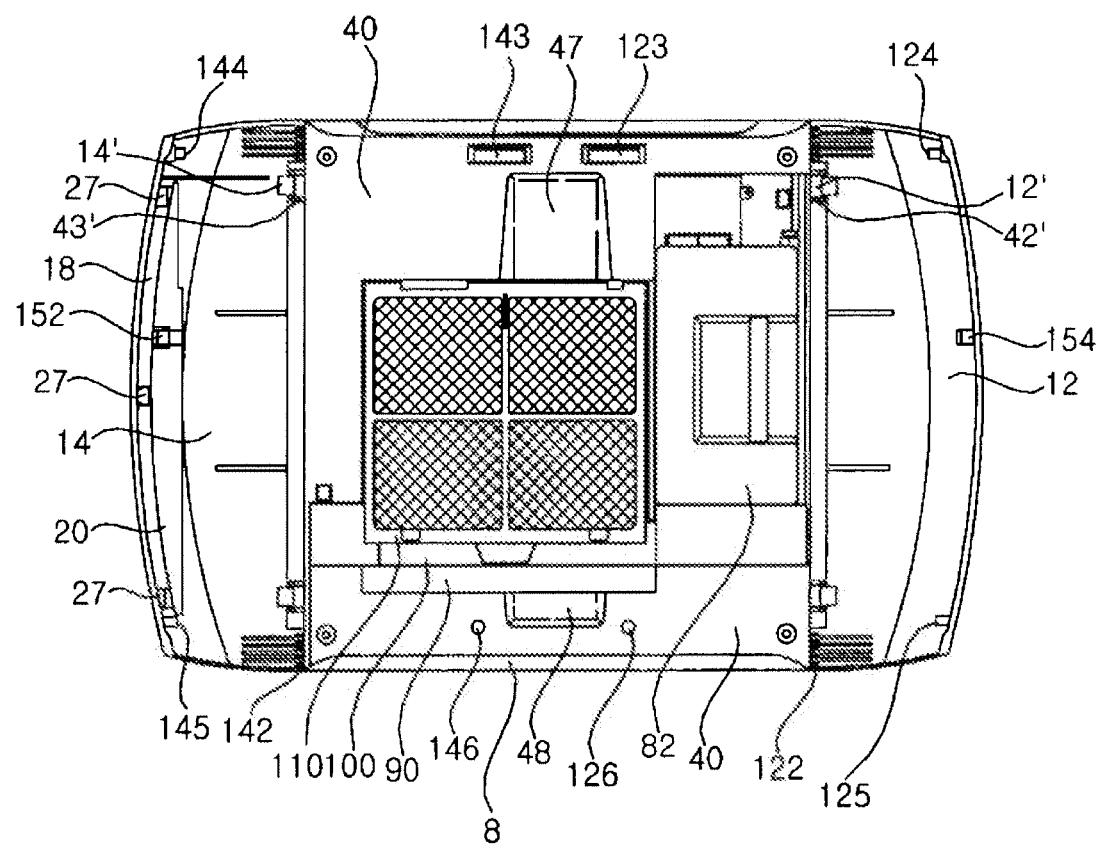
FIG. 11 is a control block diagram showing an embodiment of the wall mount-type evaporative humidifier according to the present invention.

FIG. 10 is a front view when both the left and right doors are rotated laterally in an embodiment of the wall mount-type evaporative humidifier according to the present invention, and FIG. 11 is a control block diagram showing an embodiment of the wall mount-type evaporative humidifier according to the present invention.

The wall mount-type evaporative humidifier according to the present embodiment further includes a door close holding unit for holding the closing of the front door 10 (in particular, the left door 12 and the right door 14) to the main body 2, in particular, the front casing 40, and a sinking preventing unit for preventing the front door 10, in particular, the left door 12 and the right door 14 from sinking.

The door close holding unit includes a left magnet 123 disposed at a position of the front casing 40, which is covered with the left door 12, a left magnetic material 124 disposed in the left door 12 and configured to experience the influence of gravity together with the left magnet 123, a right magnet 143 disposed at a position of the front casing 40, which is covered with the right door 14, and a right magnetic material 144 disposed in the right door 14 and configured to experience the influence of gravity together with the right magnet 143.

The sinking preventing unit includes projections 125 and 145 respectively projecting from the left door 12 and the right door 14, and projection insertion portions 126 and 146 formed in main body 2 (in particular, the front casing 40) so that the projections 125 and 145 can be inserted into and supported by the respective projection insertion portions 126 and 146.

The projection insertion portions 126 and 146 include respective projection insertion grooves formed in the main body 2 (in particular, the front casing 40) and having the respective projections 125 and 145 inserted thereinto.

Meanwhile, the door opening detection mechanism 150 functions to detect whether the door 12 other than the door 14 in which the control panel 20 is disposed is opened or not, and includes a Hall sensor 152 disposed in the control panel 20 and a magnet 154 disposed to face the Hall sensor 152 in the door 12 other than the door 14 in which the control panel 20 is disposed.

The Hall sensor 152 is connected to the control PCB 182 of the control panel 20 via lead wires.

The Hall sensor 152 projects laterally from the side of the control panel 20.

The magnet 154 is disposed so that it is placed in front of the Hall sensor 152 when the door 12 other than the door 14 in which the control panel 20 is disposed is closed.

The operation of the present invention constructed as described above is described below.

First, when an operation command is input through the remote controller R or the operation key 26 of the control panel 20, the control panel 20 outputs a signal depending on a detection result of the Hall sensor 152 of the door opening detection mechanism 150 and the input of the operation command to the control unit 160. If the operation command has been input and the Hall sensor 152 of the door opening detection mechanism 150 detects that the door has been closed, the control unit 160 drives the ventilator 50 (in particular, the fan motor 54), drives the wind direction control mechanism 70 (in particular, the vane motor 74) in opening mode, and turns on the lateral illuminators 37 and 38. When the vane motor 74 operates in the opening mode, the blower vane 72 opens the air blower port 6 and, at the same time, guides a wind of air blown to the air blower port 6.

When the fan motor 54 is driven, the fan 56 is rotated, and air in front of the front door 10 is sucked into the rear side of the front door 10 through the air intake duct 16 between the left door 12 and the control panel 20 and the air intake duct 18 between the right door 14 and the control panel 20 and then passes through the front air intake port 4. Further, air beneath the front casing 40 in a room is sucked into the rear side of the front air intake port 4 through the lower air intake port 8.

As described above the air passed through the front air intake port 4 and the air passed through the lower air intake port 8 are joined together and then purified while passing through the purification unit 110. The purified air evaporates water, absorbed by the humidification filter 100, and is supplied with moisture while passing through the humidification filter 100.

The air, which has been purified and supplied with moisture in an evaporative manner as described above, is introduced into the ventilator 50 and then blown to the blower portion 58. Next, the air is blown to the interior of a room while being guided by the blower vane 72.

Meanwhile, during the above operation, the control unit 160 drives the water sterilizer 94 and the water sterilizer 94 sterilizes water of the water guide 90. The water of the water tank 82 is made soft by the soft water filter 93 and then sterilized. The sterilized water flows into the humidification filter 100 and is then absorbed by the humidification filter 100. The humidification filter 100 continues to supply moisture to air while being evaporated by air passing through the purification unit 110.

Further, during the above operation, the water level sensor 92 detects a water level and outputs the detected water level to the control unit 160. If the detected water level of the water level sensor 92 is less than a preset value, the control unit 160 determines that there is no water in the water guide 90 and outputs a signal, informing that there is no water, to the control panel 20. The control panel 20 turns on the water supply informing display unit 24 in order to inform that there is no water in the water tank 82.

Meanwhile, when the lateral illuminators 37 and 38 are turned on, light irradiated from the plurality of LEDs 36c transmits the transparent plate 36d and is then irradiated laterally. The irradiated light is partially irradiated to the wall W and, at the same time, forms indirect illumination between both left and right sides of the main body 2 and the wall W, thereby informing the outside that the wall mount-type evaporative humidifier is being operated.

Figure 12:
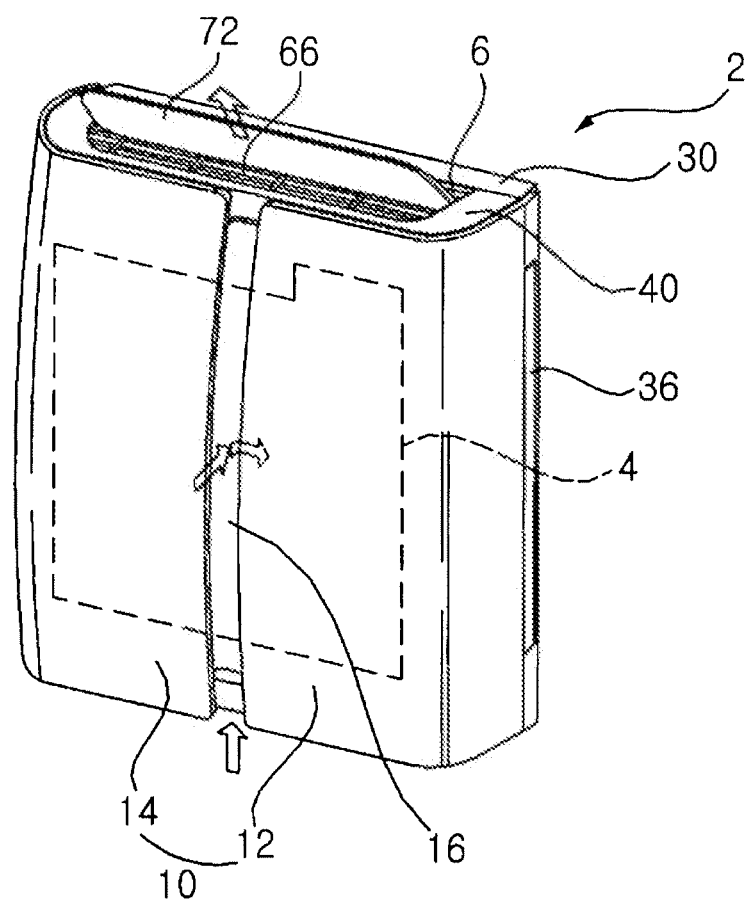
FIG. 12 is a perspective view showing another embodiment of a wall mount-type evaporative humidifier according to the present invention.
Figure 13:
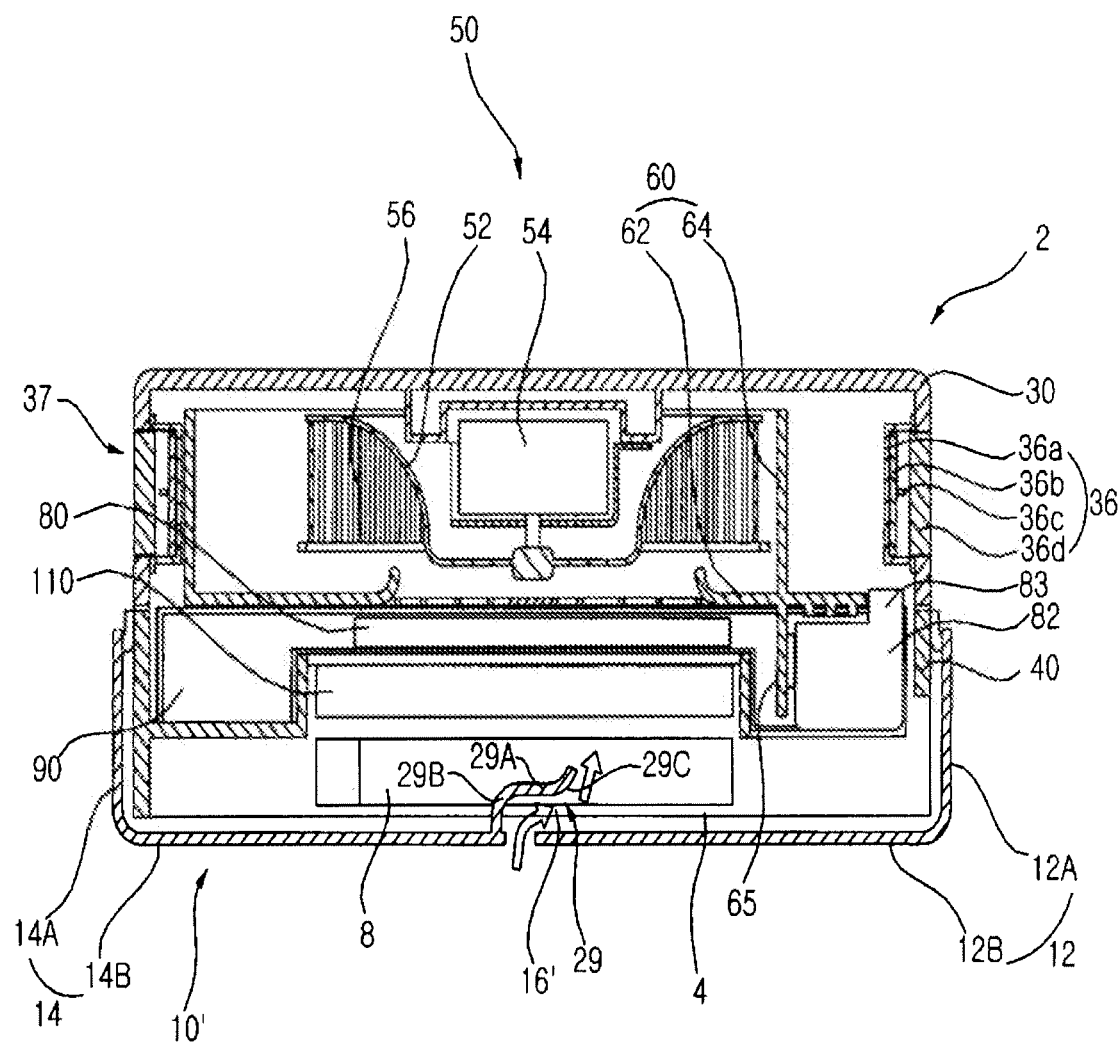
FIG. 13 is a lateral cross-sectional view showing another embodiment of the wall mount-type evaporative humidifier according to the present invention when the humidifier is actuated.
Figure 14:
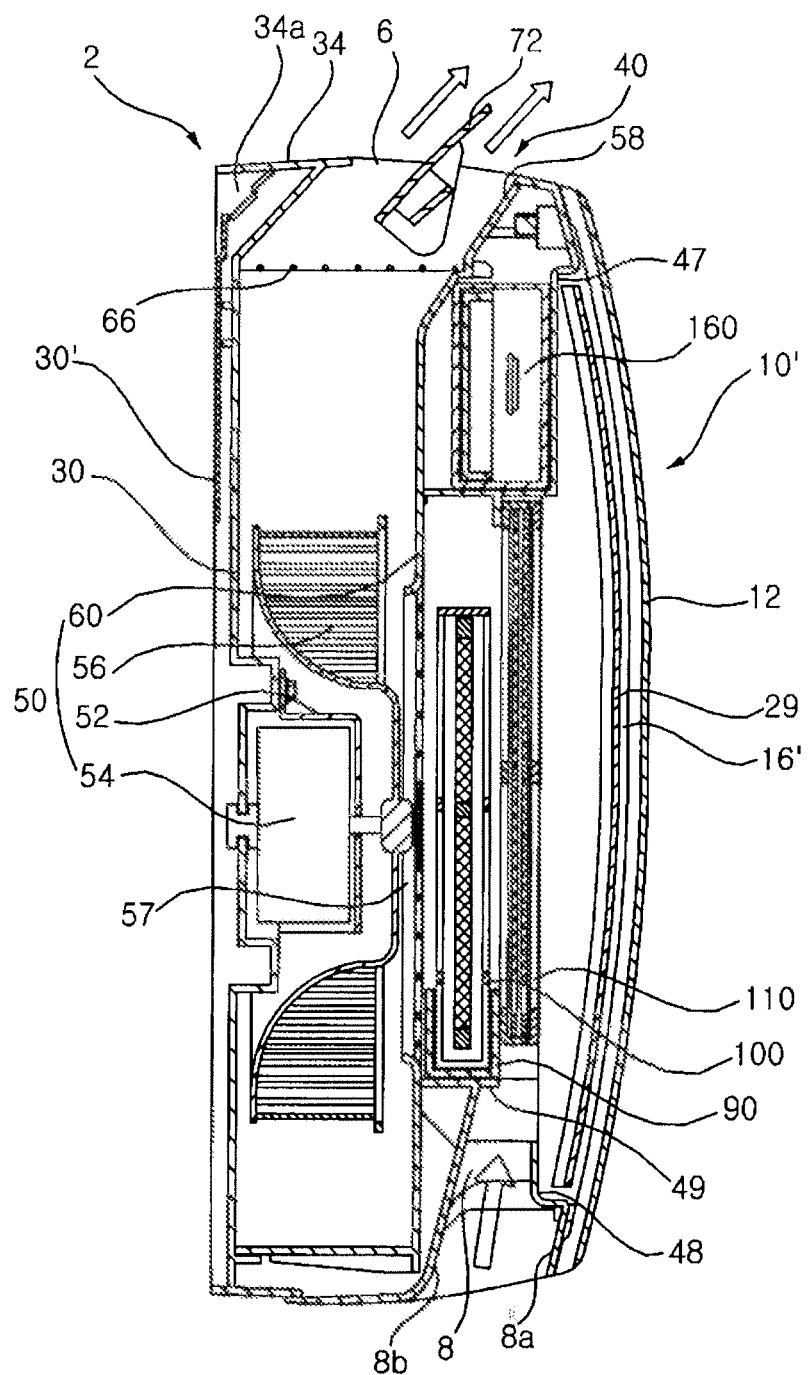
FIG. 14 is a longitudinal cross-sectional view showing another embodiment of the wall mount-type evaporative humidifier according to the present invention when the humidifier is actuated.

FIG. 12 is a perspective view showing another embodiment of a wall mount-type evaporative humidifier according to the present invention, FIG. 13 is a lateral cross-sectional view showing another embodiment of the wall mount-type evaporative humidifier according to the present invention when the humidifier is actuated, and FIG. 14 is a longitudinal cross-sectional view showing another embodiment of the wall mount-type evaporative humidifier according to the present invention when the humidifier is actuated.

A front door 10' includes a plurality of doors 12 and 14. The doors 12 and 14 are rotated in opposite directions so that they divide and cover or open a front air intake port 4 as shown in FIGS. 12 to 14. The plurality of doors 12 and 14 has an air intake duct 16?formed therebetween when they are rotated forwardly from the front air intake port 4 in order to cover all of the front air intake port 4.

The front door 10' includes a left door 12 and a right door 14. The left door 12 is coupled to the left side of the main body 2 so that the left door 12 is rotated in a left direction, and the right door 14 is coupled to the right side of the main body 2 so that the right door 14 is rotated in a right direction.

The left door 12 is disposed on the left side of the main body 2 in such a way as to be rotated in a left direction so that it covers or exposes the left side of the right and left sides of the front air intake port 4.

The right door 14 is disposed on the right side of the main body 2 in such a way as to be rotated in a right direction so that it covers or exposes the right side of the right and lefts sides of the front air intake port 4.

The air intake duct 16?formed between the left door 12 and the right door 14 is disposed in front of the front air intake port 4.

The left door 12 includes a lateral plate part 12A covering part of the side of the main body 2 and a front plate part 12B integrally formed with the lateral plate part 12A and configured to cover part of the front of the main body 2. The right door 14 includes a lateral plate part 14A covering part of the side of the main body 2 and a front plate part 14B integrally formed with the lateral plate part 14A and configured to cover part of the front of the main body 2.

That is, the front door 10' includes a left lateral plate part 12A, enabling the left door 12 to cover part of the left side of the main body 2, a left front plate part 12B integrally formed with the left lateral plate part 12A and configured to cover the left side of the front of the main body 2, a right lateral plate part 14A, enabling the right door 14 to cover part of the right side of the main body 2, and a right front plate part 14B integrally formed with the right lateral plate part 14A and configured to cover the right side of the front of the main body 2.

When the main body 2 is rotated forward, the left front plate part 12B and the right front plate part 14B of the left door 12 and the right door 14 are spaced apart from each other.

An intake guide unit 29 for guiding the suction of air is formed in one (for example, the right door 14) of the left door 12 and the right door 14 and spaced apart from one (for example, the right door 14) of the left door 12 and the right door 14 so that the air intake duct 16?is formed between the intake guide unit 29 and the other (for example, the left door 12) of the left door 12 and the right door 14.

The intake guide unit 29 may be integrally formed with the left door 12 and spaced apart from the right door 14 or be integrally formed with the right door 14 and spaced apart from the left door 12. It is hereinafter assumed that the intake guide unit 29 is integrally formed with the right door 14 and spaced apart from the left door 12.

The intake guide unit 29 is projected rearward and then curved so that it is partially covered with the door 12 in which the intake guide unit 29 is not formed, of the left door 12 and the right door 14.

The intake guide unit 29 overlaps the door 12 in which the intake guide unit 29 is not formed in forward and backward directions so that the front air intake port 4 is not directly exposed through a gap between the left front plate part 12B of the left door 12 and the right front plate part 14B of the right door 14.

The intake guide unit 29 includes a separation portion 29A and round portions 29B and 29C formed in at least one end of the separation portion 29A. The separation portion 29A is spaced apart from the front plate part 12B of the door 12 in which the intake guide unit 29 is not formed, of the left door 12 and the right door 14, and formed in parallel to the front plate part 12B.

The round portions 29B and 29C include a first round portion 29B formed roundly between the right front plate part 14B of the right door 14 and the separation portion 29A and a second round portion 29C formed roundly from the other side of the first round portion 29B, of both ends of the separation portion 29A, to a direction toward the inside of the main body 2 (that is, in a direction opposite to the first round portion 29B).

Meanwhile, the present invention is not limited to the above embodiments, but if the remote controller R is manipulated when the wall mount-type evaporative humidifier is not operated, the lateral illuminators 37 and 38 may be turned on in order to form indirect illumination. It will be understood that various changes and modifications may be made without departing from the spirit and scope of the invention as defined in the following claims.

The invention claimed is:

1. A wall mount-type evaporative humidifier, comprising:
   a main body mounted on a wall having a front side, a lower portion, and a topside, the main body including a front air intake port, a first air intake port and an air blower port, wherein the front air intake port is on the front side of the main body, the first air intake port is at the lower portion of the main body, and the air blower port for blowing air is at the topside of the main body;
   a ventilator within the main body and configured to suck air into the front air intake port and first air intake port, and blow the air toward the air blower port;
   a water guide within the main body and having a water channel;
   a water tank configured to contain water to supply the water to the water guide;
   a humidification filter disposed in front of the ventilator to absorb water of the water guide and to supply moisture to the air flowing toward the ventilator; and
   a purification unit disposed between the front air intake port and the humidification filter to purity the air flowing toward the humidification filter,
   wherein the first air intake port is open at a lower rear side of the front air intake port,
   wherein the first air intake port is formed at a position where the first air intake port overlaps the air blower port in a vertical direction,
   wherein the main body comprises a duct formed to incline from the first air intake port toward the purification unit to guide the air sucked through the first air intake port, to the purification unit,
   wherein the duct comprises front and rear plate parts, which are spaced apart from each other in forward and backward directions on the lower portion of the main body, and left and right plate parts which are spaced apart from each other in rightward and leftward directions on the lower portion of the main body,
   wherein the main body further comprises a seated unit formed horizontally at the top end of the rear plate part of the duct,
   wherein the water guide is placed on the seated unit.

2. The wall mount-type evaporative humidifier of claim 1, wherein:
   the water guide is lengthily disposed in rightward and leftward directions on a lower front side of the ventilator,
   an intake portion is eccentrically formed on one of right and left sides of the ventilator,
   the humidification filter is disposed in front of the intake portion of the ventilator, and
   the water tank is disposed on a side of the humidification filter.

3. The wall mount-type evaporative humidifier of claim 1, wherein:
   the ventilator comprises a centrifugal fan having an intake portion formed on its front side and a blower portion formed on its topside, and
   the blower portion is obliquely formed in a direction toward the upper front side.

4. The wall mount-type evaporative humidifier of claim 1, further comprising a front door rotatably coupled to the main body in order to cover or expose the front air intake port and having an air intake duct formed therein.

5. The wall mount-type evaporative humidifier of claim 4, wherein the front door comprises:
   a left door coupled to a left side of the main body in such a way as to rotate right and left;
   a right door coupled to a right side of the main body in such a way as to rotate right and left; and
   a control panel disposed in one of the left and right doors so that the air intake duct is formed between the control panel and at least one of the left and right doors while covering between-the left door and-the right door.

6. The wall mount-type evaporative humidifier of claim 5, wherein each of the left door and the right door comprises:
   a lateral plate part covering part of a side of the main body, and
   a front plate part integrally formed with the lateral plate part and covering part of a front of the main body.

7. The wall mount-type evaporative humidifier of claim 4, wherein the front door comprises:
   a left door coupled to a left side of the main body in such a way as to rotate in a left direction; and
   a right door coupled to a right side of the main body in such a way as to rotate in a right direction and configured to form the air intake duct between the right door and the left door.

8. The wall mount-type evaporative humidifier of claim 7, wherein an intake guide unit for guiding suction of the air is formed in one of the left door and the right door and spaced apart from the one of the left door and the right door so that the air intake duct is formed between the intake guide unit and the other of the left door and the right door.

9. The wall mount-type evaporative humidifier of claim 1, wherein the main body comprises:
   a rear casing mounted on the wall, and
   a front casing disposed in front of the rear casing and having the front air intake port, the first air intake port and the air blower port therein.

10. The wall mount-type evaporative humidifier of claim 1, further comprising lateral illuminators disposed on respective left and right sides of the main body and configured to irradiate light to the side of the main body.

11. The wall mount-type evaporative humidifier of claim 10, wherein the main body includes illuminator installation units in which the lateral illuminators are respectively disposed on the left and right sides of the main body.

12. The wall mount-type evaporative humidifier of claim 10, wherein each of the lateral illuminators comprises:
   an illumination casing disposed within the main body and configured to have an open side;
   a PCB disposed in the illumination casing;
   a plurality of LEDs disposed in the PCB in the state in which the LEDs are spaced apart from each other; and
   a transparent plate configured to cover the open side of the illumination casing and to pass light, irradiated from the plurality of LEDs, therethrough.

13. The wall mount-type evaporative humidifier of claim 12, wherein the transparent plate is disposed on the same plane as the side of the main body.

14. The wall mount-type evaporative humidifier of claim 10, further comprising:
   a control panel for manipulating the wall mount-type evaporative humidifier; and
   a control unit for controlling the ventilator and the lateral illuminators when the control panel is manipulated.

15. The wall mount-type evaporative humidifier of claim 14, wherein, when an operation command is input through the control panel, the control unit drives the ventilator and at the same time turns on the lateral illuminators.

16. The wall mount-type evaporative humidifier of claim 1, wherein the wall mount-type evaporative humidifier is mounted on a wall of the room, which is opposite to a wall in which an air conditioner for lowering an indoor temperature is mounted.

* * * * *